(12) United States Patent
Janssen et al.

(10) Patent No.: US 12,376,535 B2
(45) Date of Patent: Aug. 5, 2025

(54) METHOD OF GROWING PLANTS

(71) Applicant: ROCKWOOL A/S, Hedehusene (DK)

(72) Inventors: Frank Hendrikus Peter Janssen, Hedehusene (DK); Dorte Bartnik Johansson, Hedehusene (DK); Miroslav Nikolic, Hedehusene (DK)

(73) Assignee: Rockwool A/S, Hedehusene (DK)

( * ) Notice: Subject to any disclaimer, the term of this patent is extended or adjusted under 35 U.S.C. 154(b) by 0 days.

(21) Appl. No.: 18/316,754

(22) Filed: May 12, 2023

(65) Prior Publication Data

US 2023/0329161 A1    Oct. 19, 2023

Related U.S. Application Data

(63) Continuation of application No. 16/839,761, filed on Apr. 3, 2020, now Pat. No. 11,690,332.

(51) Int. Cl.
*A01G 24/42*    (2018.01)
*C08J 3/24*    (2006.01)
(Continued)

(52) U.S. Cl.
CPC .............. *A01G 24/42* (2018.02); *C08J 3/24* (2013.01); *C08K 5/0016* (2013.01);
(Continued)

(58) Field of Classification Search
CPC ...... A01G 24/42; D04H 1/4209; D04H 1/641; C08K 5/0025; C08K 7/10; C08K 5/0016;
(Continued)

(56) References Cited

U.S. PATENT DOCUMENTS

| 3,093,604 A | 6/1963 | Ayers |
| 3,285,801 A | 11/1966 | Sargent |

(Continued)

FOREIGN PATENT DOCUMENTS

| CA | 2277286 | 7/1998 |
| CN | 1944014 A | 4/2007 |

(Continued)

OTHER PUBLICATIONS

International Search Report, International Application No. PCT/EP2019/077133, mail date Dec. 9, 2019, 6 pages.

(Continued)

*Primary Examiner* — Vu A Nguyen
(74) *Attorney, Agent, or Firm* — SALIWANCHIK, LLOYD & EISENSCHENK

(57) ABSTRACT

A method of growing plants in a coherent growth substrate product is provided and includes: providing at least one coherent growth substrate product comprising man-made vitreous fibres (MMVF) bonded with a cured aqueous binder composition; positioning one or more seeds, seedlings, cuttings or plants in contact with the growth substrate product; and irrigating the growth substrate product. The aqueous binder composition prior to curing includes a component (i) in the form of one or more oxidized lignins, a component (ii) in the form of one or more cross-linkers, and a component (iii) in the form of one or more plasticizers.

18 Claims, 11 Drawing Sheets

(51) Int. Cl.
  *C08K 5/00* (2006.01)
  *C08K 7/10* (2006.01)
  *C08L 97/00* (2006.01)
  *D04H 1/4209* (2012.01)
  *D04H 1/64* (2012.01)

(52) U.S. Cl.
  CPC .............. *C08K 5/0025* (2013.01); *C08K 7/10* (2013.01); *C08L 97/00* (2013.01); *D04H 1/4209* (2013.01); *D04H 1/641* (2013.01); *C08J 2397/00* (2013.01); *C08L 2201/54* (2013.01)

(58) Field of Classification Search
  CPC ......... C08J 3/24; C08J 2397/00; C08L 97/00; C08L 2201/54
  USPC .......................................................... 47/59 S
  See application file for complete search history.

(56) References Cited

U.S. PATENT DOCUMENTS

| | | | |
|---|---|---|---|
| 5,382,608 | A | 1/1995 | Gardzielia |
| 6,238,475 | B1 | 5/2001 | Gargulak et al. |
| 6,706,853 | B1 | 3/2004 | Stanssens et al. |
| 6,818,699 | B2 | 11/2004 | Kajimaru et al. |
| 8,623,234 | B2 | 1/2014 | Jaffrennou |
| 8,993,735 | B2 * | 3/2015 | Passauer ................ C09K 17/16 530/502 |
| 2003/0042344 | A1 | 3/2003 | Fisch et al. |
| 2004/0034154 | A1 | 2/2004 | Tutin et al. |
| 2010/0069662 | A1 | 3/2010 | Udo et al. |
| 2011/0159768 | A1 | 6/2011 | Crescimanno et al. |
| 2013/0283688 | A1 * | 10/2013 | Naerum ................ A01G 24/18 427/215 |
| 2014/0039146 | A1 | 2/2014 | Abidal |
| 2014/0094562 | A1 | 4/2014 | Hagiopol et al. |
| 2018/0009708 | A1 | 1/2018 | Allais |
| 2019/0338168 | A1 | 11/2019 | Laine et al. |

FOREIGN PATENT DOCUMENTS

| | | |
|---|---|---|
| CN | 107 286 873 | 10/2017 |
| DE | 42 26 329 | 5/1993 |
| DE | 10 2004 047193 | 9/2005 |
| EP | 1770123 A1 | 4/2007 |
| EP | 1897433 | 3/2008 |
| EP | 3299421 | 3/2018 |
| EP | 3632866 | 4/2020 |
| FR | 2976583 | 12/2012 |
| FR | 2976584 | 12/2012 |
| GB | 2177048 | 1/1987 |
| WO | 93/04242 | 3/1993 |
| WO | 98/31763 | 7/1998 |
| WO | 98/31895 | 7/1998 |
| WO | 02/066877 | 8/2002 |
| WO | 2004/033194 | 4/2004 |
| WO | 2008/009460 | 1/2008 |
| WO | 2008/009462 | 1/2008 |
| WO | 2008/009465 | 1/2008 |
| WO | 2008/009467 | 1/2008 |
| WO | 2008/073186 | 6/2008 |
| WO | 2008/155401 | 12/2008 |
| WO | 2009/090053 | 7/2009 |
| WO | 2010/003677 | 1/2010 |
| WO | 2010/046074 | 4/2010 |
| WO | 2011/042610 | 4/2011 |
| WO | 2011/044490 | 4/2011 |
| WO | 2012/028650 | 3/2012 |
| WO | 2012/113058 | 8/2012 |
| WO | 2012/172262 | 12/2012 |
| WO | 2013/034376 | 3/2013 |
| WO | 2014/029872 | 2/2014 |
| WO | 2016/120576 | 8/2016 |
| WO | 2016/120579 | 8/2016 |
| WO | 2017/114723 | 7/2017 |
| WO | 2017/114724 | 7/2017 |
| WO | WO-2017114723 A1 * | 7/2017 ............ A01G 24/00 |
| WO | 2018/206132 | 11/2018 |
| WO | 2020/018599 | 1/2020 |
| WO | 2020/070337 | 4/2020 |
| WO | 2020/070341 | 4/2020 |

OTHER PUBLICATIONS

International Search Report and Written Opinion, International Application No. PCT/EP2020/059645, mail date Feb. 23, 2021, 17 pages.
International Search Report and Written Opinion, International Application No. PCT/EP2020/059649, mail date Oct. 21, 2020, 13 pages.
International Search Report and Written Opinion, International Application No. PCT/EP2020/059619, mail date Dec. 7, 2020, 22 pages.
International Search Report and Written Opinion, International Application No. PCT/EP2020/059671, mail date Jan. 18, 2021, 12 pages.
International Search Report and Written Opinion, International Application No. PCT/EP2020/059636, mail date Dec. 11, 2020, 20 pages.
International Search Report and Written Opinion, International Application No. PCT/EP2020/059670, mail date Jan. 18, 2021, 12 pages.
International Search Report and Written Opinion, International Application No. PCT/EP2020/059666, mail date Jan. 25, 2021, 14 pages.
International Search Report and Written Opinion, International Application No. PCT/EP2020/059651, mail date Jan. 25, 2021, 15 pages.
International Search Report and Written Opinion, International Application No. PCT/EP2020/059650, mail date Dec. 10, 2020, 17 pages.
International Search Report and Written Opinion, International Application No. PCT/EP2020/059660, mail date Jan. 18, 2021, 12 pages.
International Search Report and Written Opinion, International Application No. PCT/EP2020/059655, mail date Jan. 18, 2021, 13 pages.
International Search Report and Written Opinion, International Application No. PCT/EP2020/059617, mail date Dec. 15, 2020, 16 pages.
International Search Report, International Application No. PCT/EP201/076123, mail date Oct. 21, 2019, 4 pages.
International Search Report and Written Opinion, International Application No. PCT/EP2020/059656, mail date Dec. 18, 2020, 16 pages.
International Search Report and Written Opinion, International Application No. PCT/EP2020/059659, mail date Jan. 18, 2021.
Masoumeh Ghorbani et al., Ammoxidized Fenton-Activated Pine Kraft Lignin Accelerates Synthesis and Curing of Resole Resins, Polymers 2017, 9, 43.
Dietrich Meier et al., Conversion of Technical Lignins into Slow-Release Nitrogenous Fertilizers by Ammoxidation n Liquid Phase, Bioresource Technology, 49, 1994, 121-128.
Venla Hemmila et al., Lignin: an adhesive raw material of the future or waste of research energy?, Northern European Network for Wood Science and Engineering (WSE), Sep. 11-12, 2013, pp. 98-103.
International Search Report/Written Opinion, PCT/EP2020/059653, mail date Dec. 9, 2020, PCT/ISA/210, PCT/ISA/220, PCT/ISA/237.
Xiangwei Zhu et al., Bio-Based Wood Adhesive from Camelina Protein (a Biosiesel Residue) and Depolymerized Lignin with Improved Water resistance, ACS Omega, Nov. 16, 2017, vol. 2, No. 11, 7996-8004.

* cited by examiner

Properties of technical lignins

| Lignin Type | Sulfur Lignins | | Sulfur-free lignins | |
|---|---|---|---|---|
| | Kraft | Lignosulfate | Soda | Organosolv |
| Raw materials | Softwood Hardwood | Softwood Hardwood | Annual plants | Softwood Hardwood Annual Plants |
| Solubility | Alkali Organic solvents | Water | Alkali | Wide range of organic solvents |
| Number-average molar mass ($M_n$-gmol$^{-1}$) | 1000-3000 | 15,000-50,000 | 800-3000 | 500-5000 |
| Polydispersity | 2.5-3.5 | 6-8 | 2.5-3.5 | 1.5-2.5 |
| $T_g$(°C) | 140-150 | 130 | 140 | 90-110 |

FIG. 7

METHOD OF GROWING PLANTS

CROSS-REFERENCE TO RELATED APPLICATION

The present application is a continuation application of U.S. application Ser. No. 16/839,761, filed Apr. 3, 2020, the disclosure of which is hereby incorporated by reference in its entirety, including all figures, tables, and drawings.

FIELD OF THE INVENTION

The present invention relates to a method of growing plants in a coherent growth substrate, a coherent growth substrate product, and use of a coherent growth substrate.

BACKGROUND OF THE INVENTION

It has been known for many years to grow plants in coherent growth substrates formed from man-made vitreous fibres (MMVF). MMVF products for this purpose, which are typically provided as a coherent plug, block or slab, generally include a binder in order to provide structural integrity to the product.

Historically, the primary binders of choice have been phenol-formaldehyde resins and phenol-formaldehyde urea resins, such as those disclosed in WO2009/090053, WO2008/009467, WO2008/009462, WO2008/009461, WO2008/009460 and WO2008/009465. These binders are economical to produce and provide excellent mechanical handling properties, which is highly important for plant growth substrates due to the use of automatic equipment in handling and the large amount of water held in the substrate. It is undesirable for the substrate to become damaged during handling or for the substrate to lose its rigidity and shape when holding water.

However, existing and proposed legislation directed to the lowering or elimination of formaldehyde emissions has led to the development of formaldehyde-free binders, such as those described in WO2017/114723, WO2017/114724, WO2012/028650.

At least the majority of previously known binder compositions for plant growth substrates have starting materials stemming from fossil fuels. There is an on-going trend for consumers to prefer products that are fully or at least partly produced from renewable materials and there is therefore a need to provide binders for plant growth substrates which are at least partly produced from renewable materials.

Binder compositions based on renewable materials have been proposed before, for example in WO2017/114723 and WO2017/114724. However, there are still some disadvantages associated with MMVF products prepared with these binders in terms of mechanical properties, when compared with MMVF products prepared with phenol-formaldehyde resins. In addition, such binders are often made from expensive starting materials.

In addition, there is an ongoing desire to improve the water holding properties of plant growth substrates, such as water retention or water distribution over height. There is also an ongoing desire to reduce the phytotoxicity of binders used in plant growth substrates.

There is a desire to use water and nutrients as efficiently as possible during the growing process. This is both for cost and environmental reasons. In particular, waste water containing nutrients is difficult to dispose of due to environmental legislation. It is therefore desirable to improve the water holding properties so that the amount of waste water (also called drain) is reduced Furthermore, there is an ongoing desire to reduce the amount and number of components required to produce plant growth substrates. Typically additives such as wetting agents are added to plant growth substrates in order to improve hydrophilicity. However, for environmental and cost efficiency purposes, it would be desirable to provide a binder that does not require the further addition of a wetting agent.

It would also be desirable to produce a binder that can be used in lower quantities than other binders, without comprising the mechanical properties. Therefore, it would be desirable to produce a binder for plant growth substrates which is formaldehyde-free but has equivalent or superior mechanical handling properties (e.g. compression strength) as phenol-formaldehyde binders. It would be desirable for such a binder to have improved water holding properties (e.g. water retention and water distribution over height), thus reducing water wastage and lower phytotoxicity. Furthermore, it would be desirable for such a binder to be economical to produce and be based predominantly on renewable sources. Finally, it would be desirable for such a binder to be used in reduced amounts and not to require the further addition of wetting agent.

SUMMARY OF THE INVENTION

The plant growth substrate used in the present invention solves the above problems.

In a first aspect of the invention, there is provided a method of growing plants in a coherent growth substrate product, the method comprising:
  providing at least one coherent growth substrate product comprising man-made vitreous fibres (MMVF) bonded with a cured aqueous binder composition;
  positioning one or more seeds, seedlings, cuttings or plants in contact with the growth substrate product; and
  irrigating the growth substrate product;
wherein the aqueous binder composition prior to curing comprises:
  a first component (i) comprising, or in the form of, one or more oxidized lignins;
  a second component (ii) comprising, or in the form of, one or more cross-linkers; and
  a third component (iii) comprising, or in the form of, one or more plasticizers.

The denoting of components as "first", "second", or "third" is for labeling purposes only and has no implication with respect to sequence.

In a second aspect of the invention, there is provided a coherent growth substrate product comprising man-made vitreous fibres (MMVF) bonded with a cured aqueous binder composition, wherein the aqueous binder composition prior to curing comprises:
  a first component (i) comprising, or in the form of, one or more oxidized lignins;
  a second component (ii) comprising, or in the form of, one or more cross-linkers; and
  a third component (iii) comprising, or in the form of, one or more plasticizers.

In a third aspect of the invention there is provided an array of two or more coherent growth substrate products, wherein each coherent growth substrate product comprises man-made vitreous fibres (MMVF) bonded with a cured aqueous binder composition, wherein the aqueous binder composition prior to curing comprises:
- a first component (i) comprising, or in the form of, one or more oxidized lignins;
- a second component (ii) comprising, or in the form of, one or more cross-linkers; and
- a third component (iii) comprising, or in the form of, one or more plasticizers In a fourth aspect of the invention there is provided use of a coherent growth substrate product for growing plants, wherein the coherent growth substrate product comprises man-made vitreous fibres (MMVF) bonded with a cured aqueous binder composition, wherein the aqueous binder composition prior to curing comprises:
- a first component (i) comprising, or in the form of, one or more oxidized lignins;
- a second component (ii) comprising, or in the form of, one or more cross-linkers; and
- a third component (iii) comprising, or in the form of, one or more plasticizers In a fifth aspect of the invention there is provided a method of making a growth substrate product comprising the steps of:
(i) providing MMVF;
(ii) spraying the MMVF with an aqueous binder composition;
(iii) collecting and consolidating the MMVF; and
(iv) curing the aqueous binder composition;
wherein the aqueous binder composition prior to curing comprises:
- a first component (i) comprising, or in the form of, one or more oxidized lignins;
- a second component (ii) comprising, or in the form of, one or more cross-linkers; and
- a third component (iii) comprising, or in the form of, one or more plasticizers.

The present inventors have surprisingly discovered that it is possible to produce a formaldehyde-free binder which leads to a growth substrate that has equivalent or even superior mechanical handling properties (e.g. compression strength) to phenol-formaldehyde binders. The inventors also produced such a binder that leads to a growth substrate with improved water holding properties (e.g. water retention) and lower phytotoxicity levels, which is highly desirable for plant growth and development. This results in reduced water wastage (i.e. drain). The inventors produced such a binder that is economical and is based predominantly on renewable sources. Finally, this binder can be used in low quantities and does not require the addition of a wetting agent to the growth substrate.

DESCRIPTION OF THE FIGURES

FIG. 7 shows a summary of the properties of technical lignins.

DETAILED DESCRIPTION

Figure 1A:
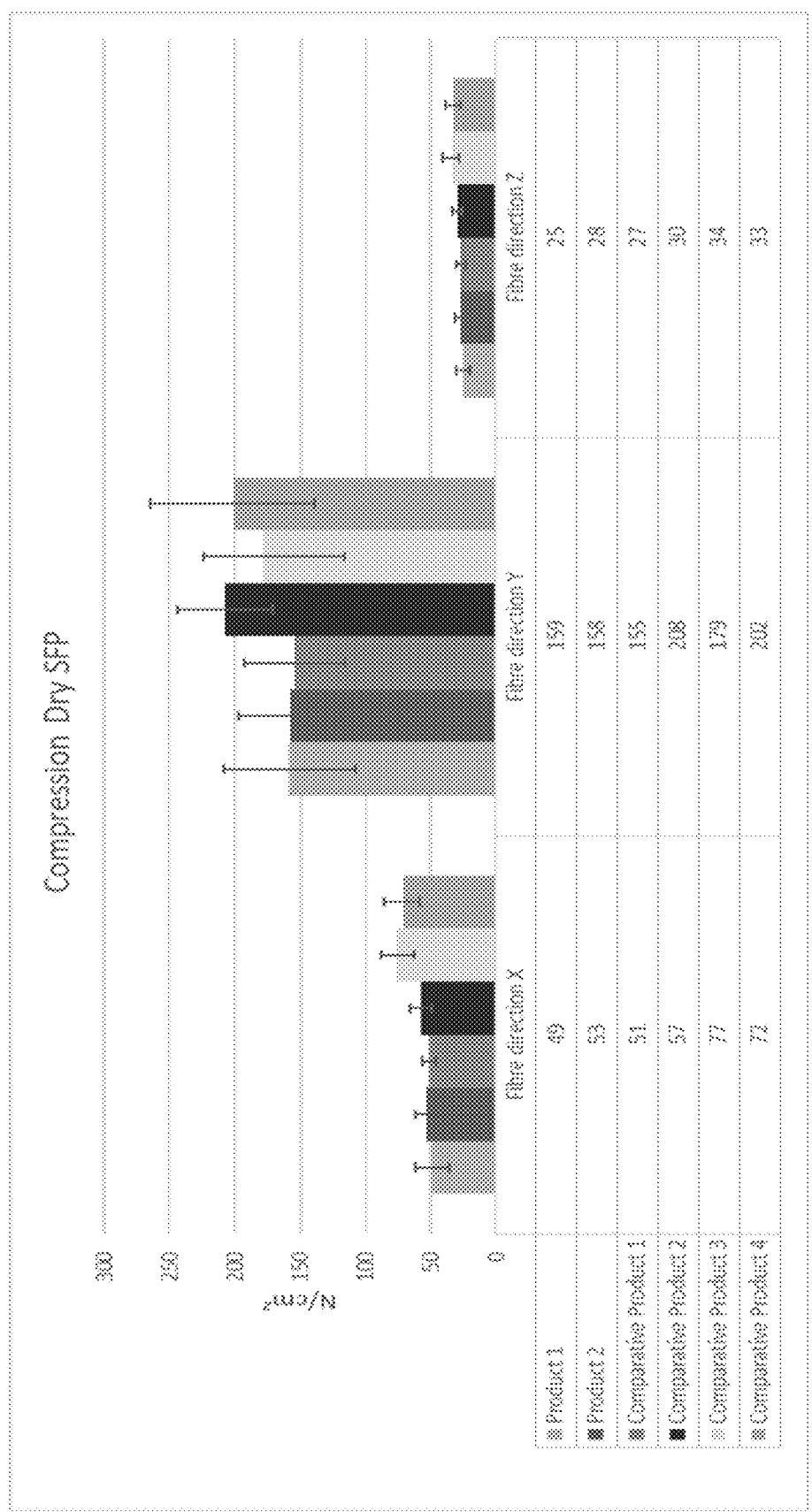
FIGS. 1A to 1E show the results of compression strength tests.
Figure 1B:
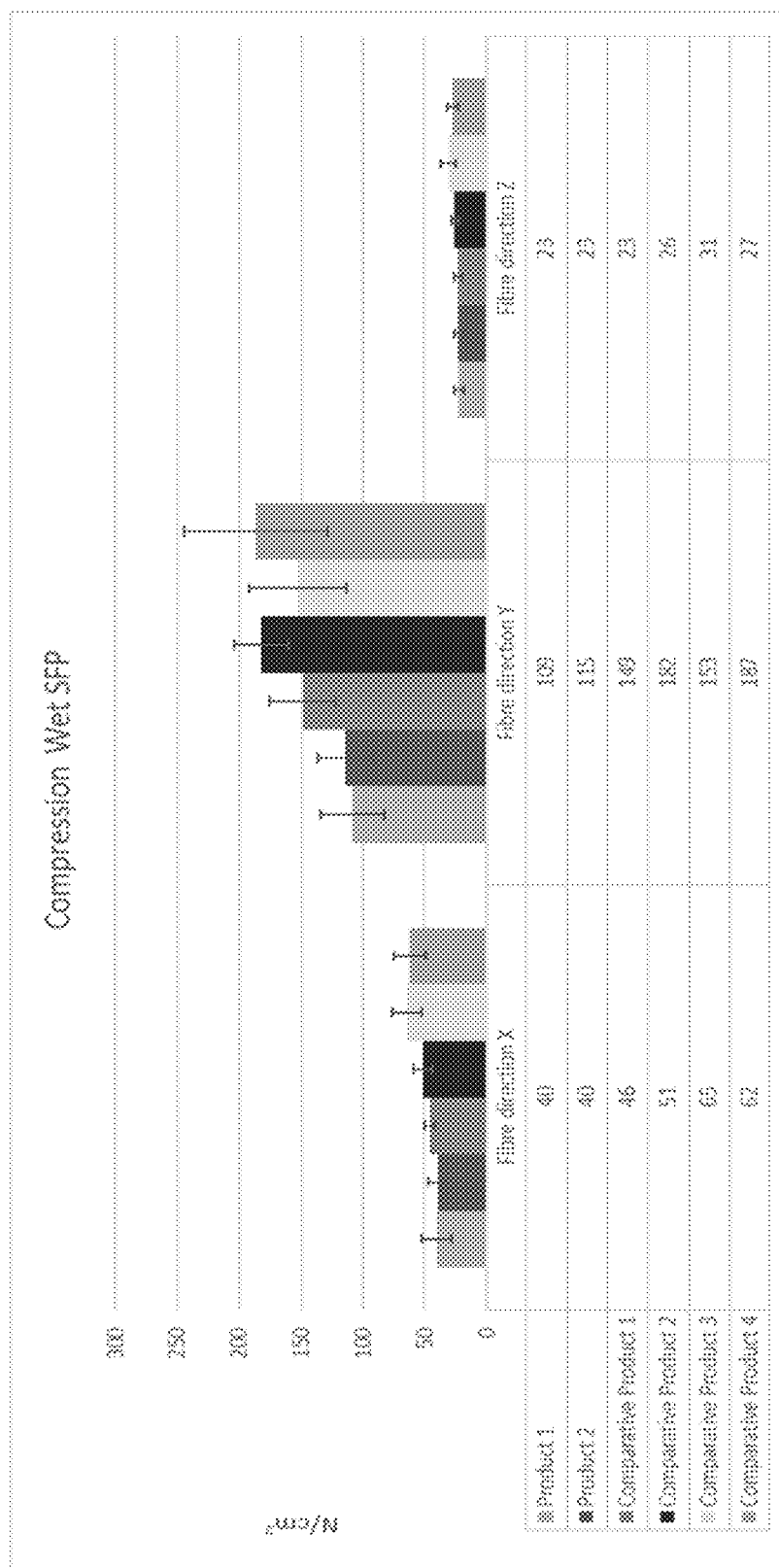
Figure 1C:
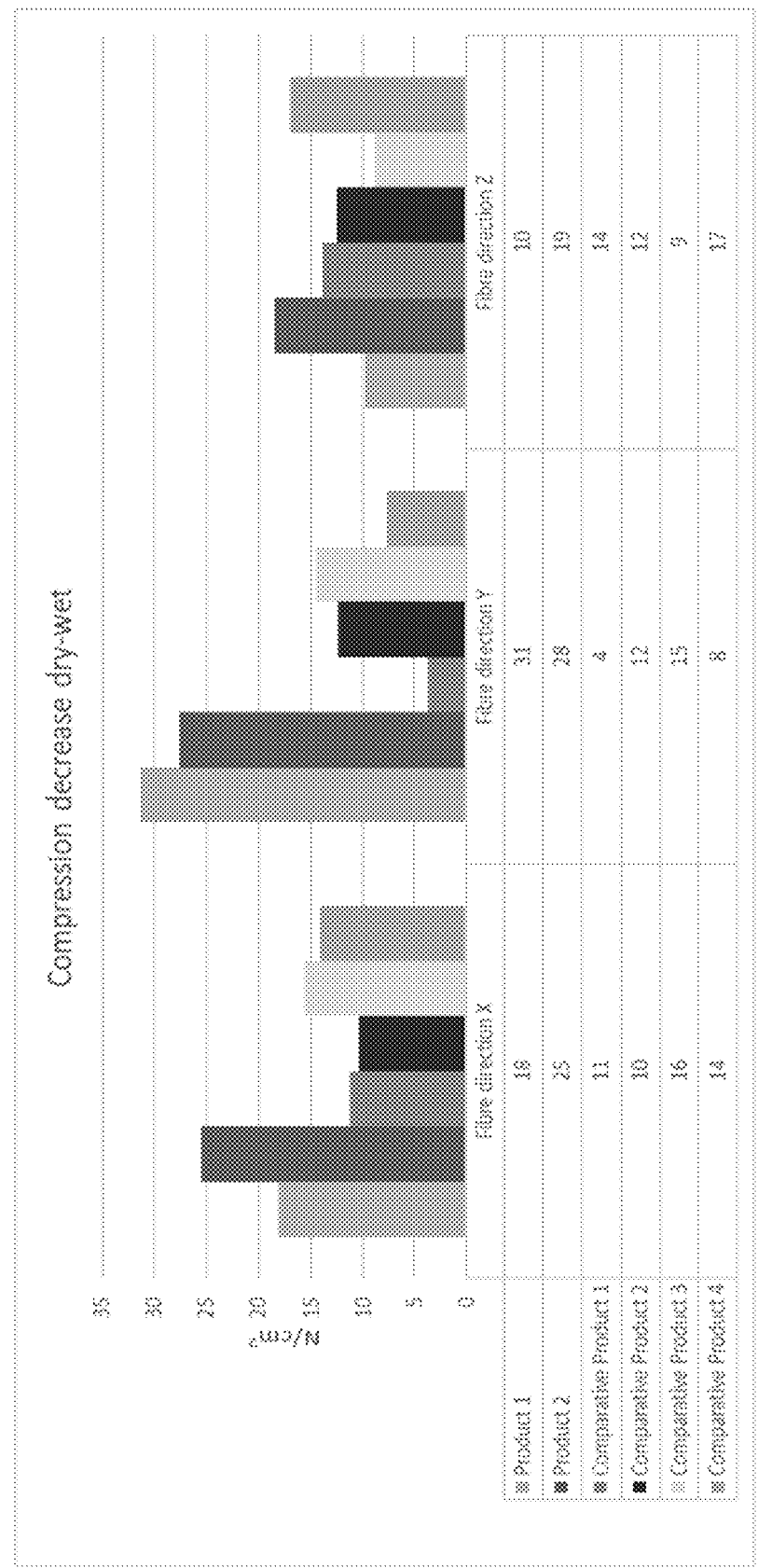
Figure 1D:
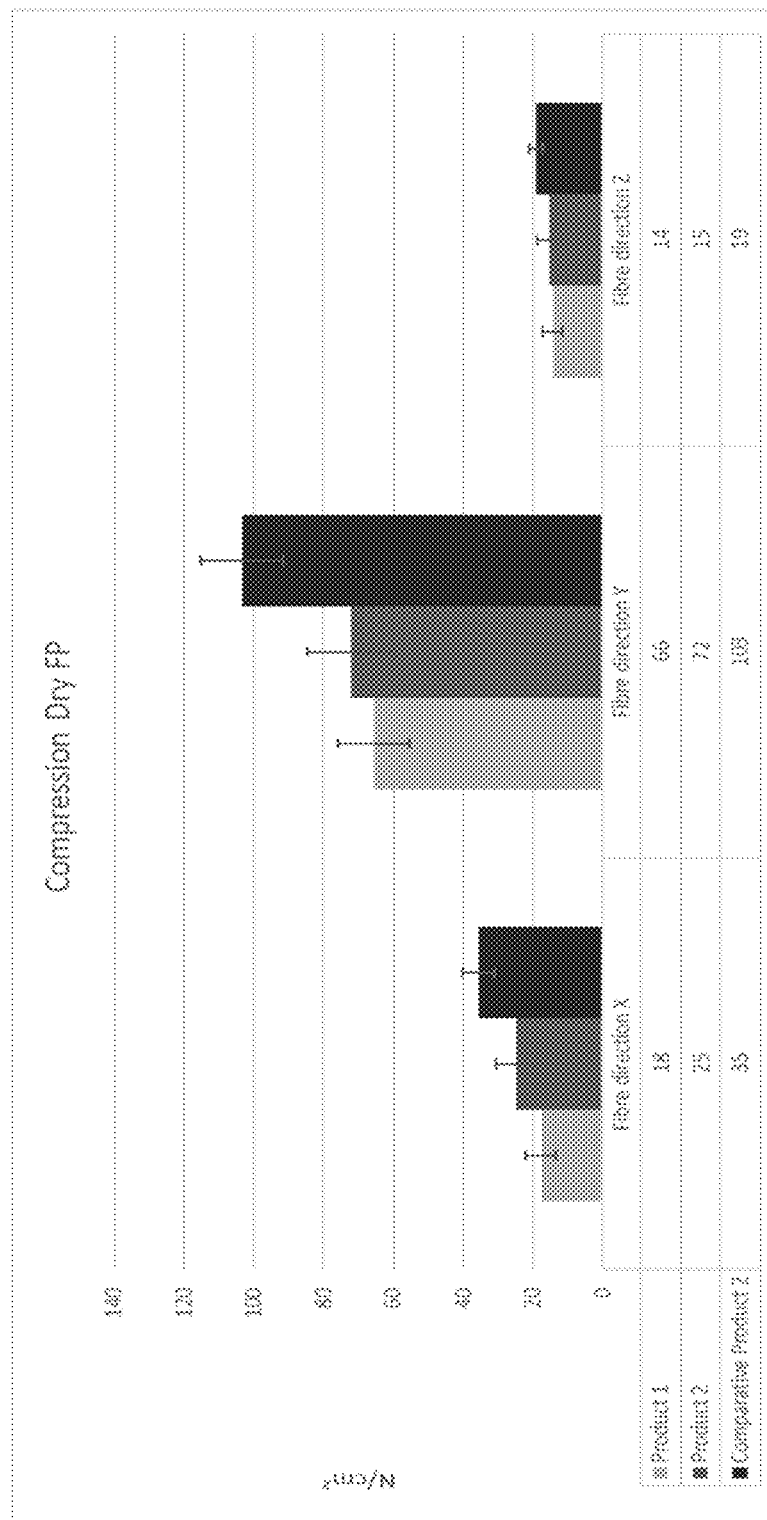
Figure 1E:
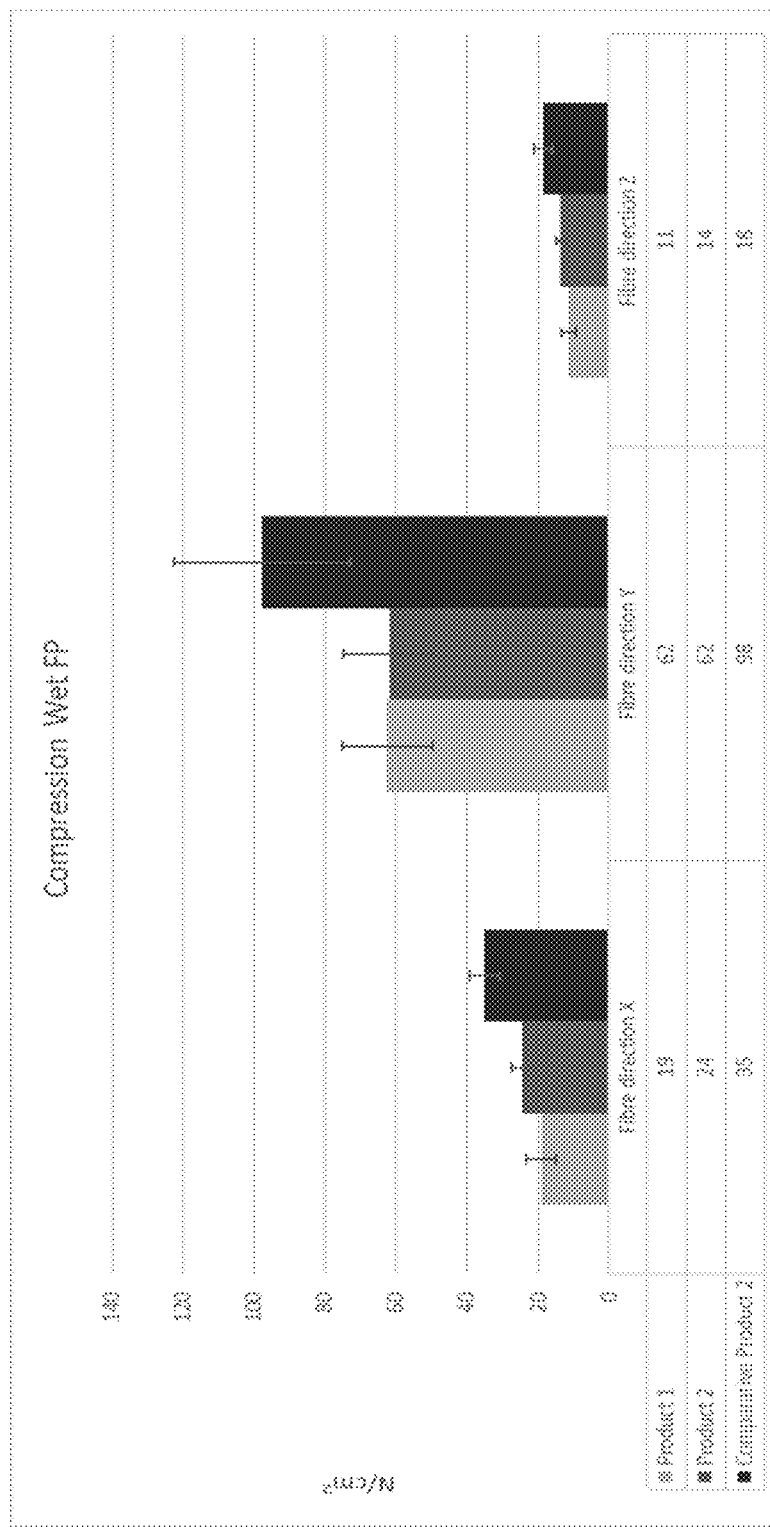

An embodiment of the present invention relates to a method of growing plants in a coherent growth substrate product, the method comprising:
- providing at least one coherent growth substrate product comprising man-made vitreous fibres (MMVF) bonded with a cured aqueous binder composition;
- positioning one or more seeds, seedlings, cuttings or plants in contact with the growth substrate product; and
- irrigating the growth substrate product;

wherein the aqueous binder composition prior to curing comprises;
- a component (i) in the form of one or more oxidized lignins;
- a component (ii) in the form of one or more cross-linkers; and
- a component (iii) in the form of one or more plasticizers.

The method of the present invention comprises a coherent growth substrate product comprising man-made vitreous fibres (MMVF). The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:
$SiO_2$: 30 to 51
CaO: 8 to 30
MgO: 2 to 25
FeO (including $Fe_2O_3$): 2 to 15
$Na_2O+K_2O$: not more than 10
CaO+MgO: 10 to 30

In preferred embodiments the MMVF have the following levels of elements, calculated as oxides in wt %:
$SiO_2$: at least 30, 32, 35 or 37; not more than 51, 48, 45 or 43
$Al_2O_3$: at least 12, 16 or 17; not more than 30, 27 or 25
CaO: at least 8 or 10; not more than 30, 25 or 20
MgO: at least 2 or 5; not more than 25, 20 or 15
FeO (including $Fe_2O_3$): at least 4 or 5; not more than 15, 12 or 10
FeO+MgO: at least 10, 12 or 15; not more than 30, 25 or 20
$Na_2O+K_2O$: zero or at least 1; not more than 10
CaO+MgO: at least 10 or 15; not more than 30 or 25
$TiO_2$: zero or at least 1; not more than 6, 4 or 2
$TiO_2+Fe_0$: at least 4 or 6; not more than 18 or 12
$B_2O_3$: zero or at least 1; not more than 5 or 3
$P_2O_5$: zero or at least 1; not more than 8 or 5
Others: zero or at least 1; not more than 8 or 5

The MMVF made by the method of the invention preferably have the composition in wt %:

| | |
|---|---|
| $SiO_2$ | 35 to 50 |
| $Al_2O_3$ | 12 to 30 |
| $TiO_2$ | up to 2 |
| $Fe_2O_3$ | 3 to 12 |
| CaO | 5 to 30 |
| MgO | up to 15 |
| $Na_2O$ | 0 to 15 |
| $K_2O$ | 0 to 15 |
| $P_2O_5$ | up to 3 |
| MnO | up to 3 |
| $B_2O_3$ | up to 3 |

Another preferred composition for the MMVF is as follows in wt %:

$SiO_2$ 39-55, preferably 39-52
$Al_2O_3$ 16-27, preferably 16-26
CaO 6-20, preferably 8-18
MgO 1-5, preferably 1-4.9
$Na_2O$ 0-15, preferably 2-12
$K_2O$ 0-15, preferably 2-12
$R_2O$ ($Na_2O+K_2O$) 10-14.7, preferably 10-13.5
$P_2O_5$ 0-3, preferably 0-2
$Fe_2O_3$ (iron total) 3-15, preferably 3.2-8
$B_2O_3$ 0-2, preferably 0-1
$TiO_2$ 0-2, preferably 0.4-1
Others 0-2.0

Glass fibres commonly comprise the following oxides, in percent by weight:

$SiO_2$: 50 to 70
$Al_2O_3$: 10 to 30
CaO: not more than 27
MgO: not more than 12

Glass fibres can also contain the following oxides, in percent by weight:

$Na_2O+K_2O$: 8 to 18, in particular $Na_2O+K_2O$ greater than CaO+MgO
$B_2O_3$: 3 to 12

Some glass fibre compositions can contain $Al_2O_3$: less than 2%.

The geometric mean fibre diameter is often in the range of 1.5 to 10 microns, in particular 2 to 8 microns, preferably 2 to 5 microns. The inventors found that this range of geometric fibre diameter positively affects capillarity thus improving water distribution over height and water uptake in the growth substrate.

The growth substrate according to the invention comprises, prior to curing, an aqueous binder composition comprising:

a component (i) in the form of one or more oxidized lignins;
a component (ii) in the form of one or more cross-linkers;
a component (iii) in the form of one or more plasticizers.

In a preferred embodiment, the binders are formaldehyde free.

For the purpose of the present application, the term "formaldehyde free" is defined to characterize a mineral wool product where the emission is below 5 micrograms per square meter per hour ($\mu g/m^2/h$) of formaldehyde from the mineral wool product, preferably below 3 $\mu g/m^2/h$. Preferably, the test is carried out in accordance with ISO 16000 for testing aldehyde emissions.

Component (i)

Component (i) is in the form of one or more oxidized lignins.

Lignin, cellulose and hemicellulose are the three main organic compounds in a plant cell wall. Lignin can be thought of as the glue that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

Figure 4:
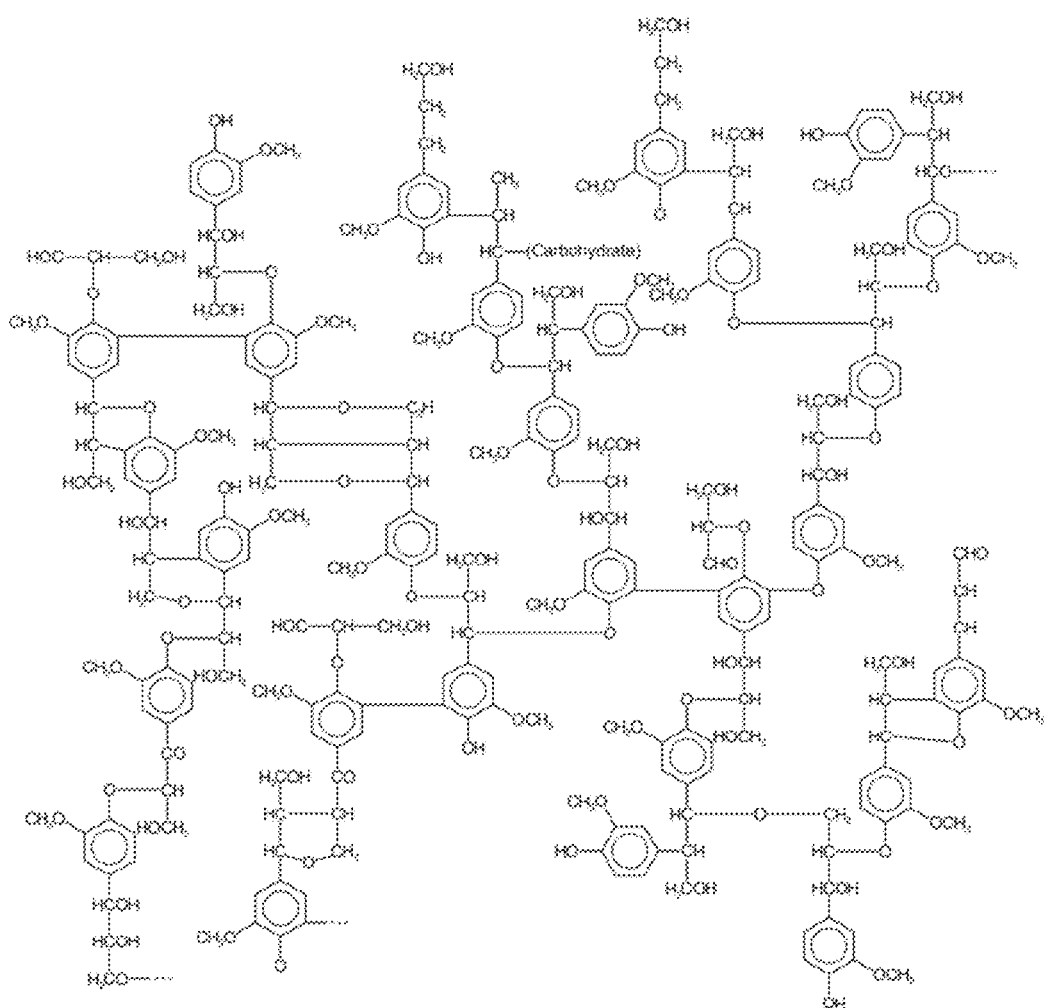
FIG. 4 shows a section from a possible lignin structure.

FIG. 4 shows a section from a possible lignin structure.

Figure 5:
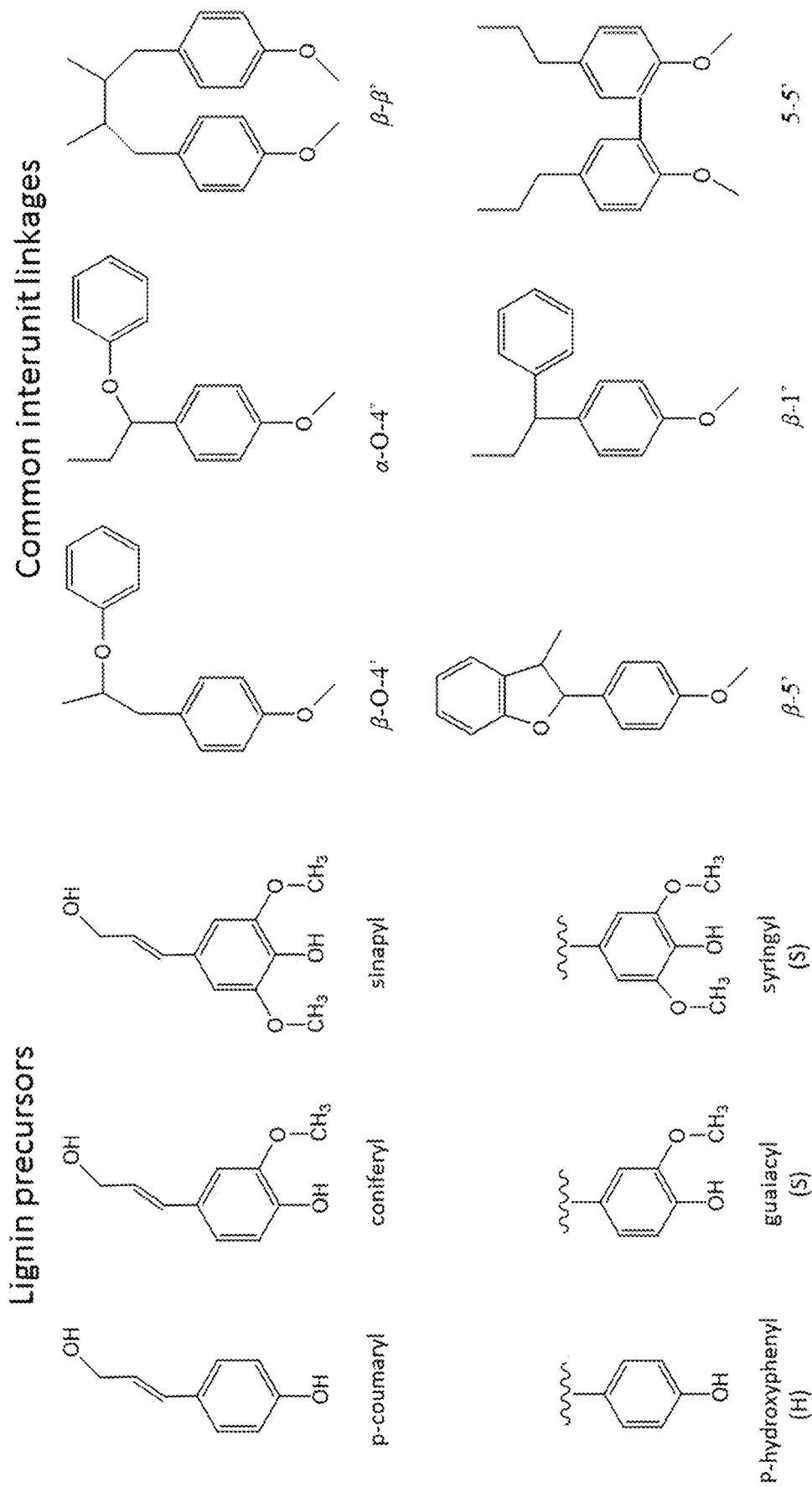
FIG. 5 shows lignin precursors and common interunit linkages.
Figure 6:
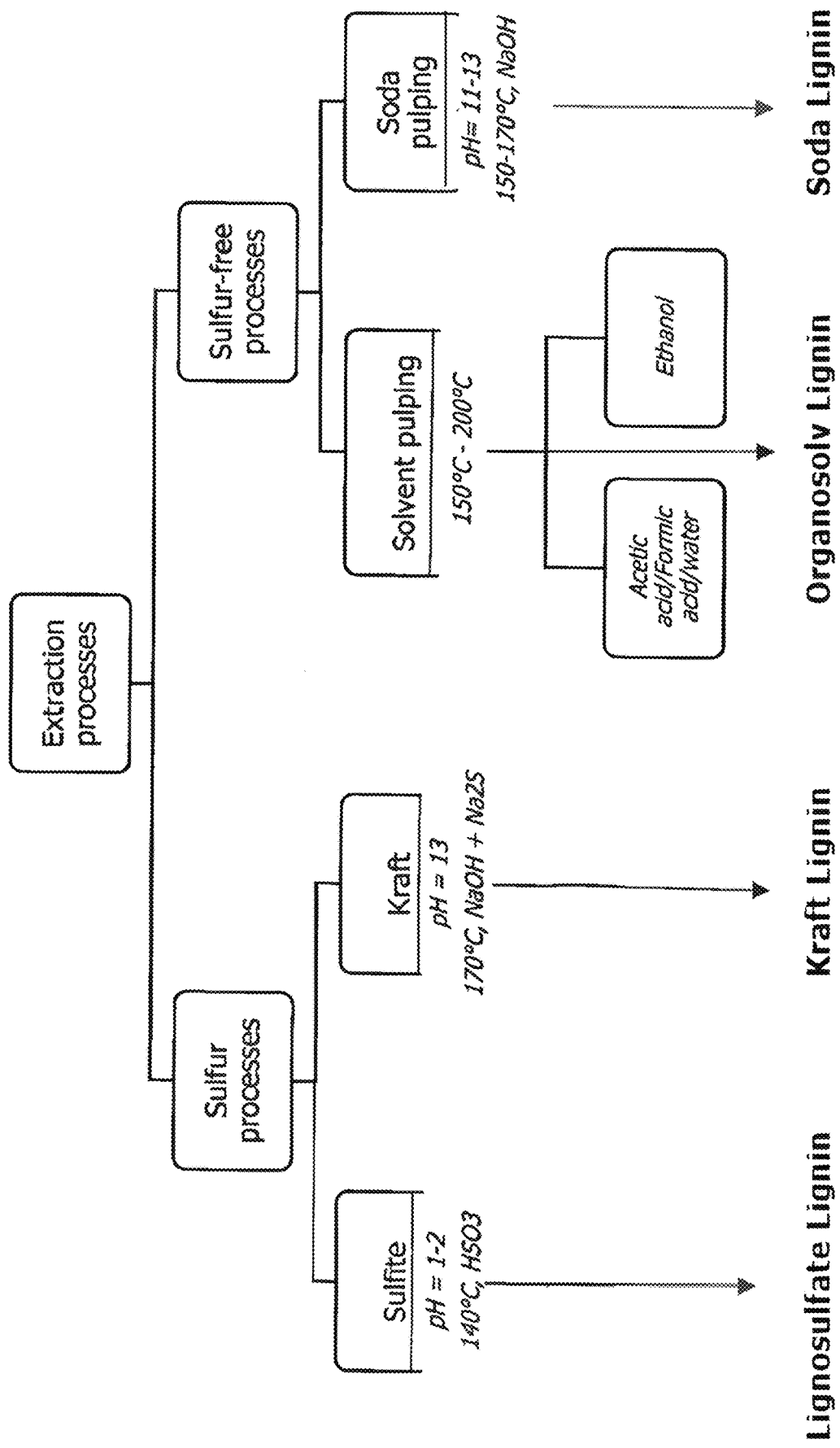
FIG. 6 shows four groups of technical lignins available in the market.

There are at least four groups of technical lignins available in the market. These four groups are shown in FIG. 6. A possible fifth group, Biorefinery lignin, is a bit different as it is not described by the extraction process, but instead by the process origin, e.g. biorefining and it can thus be similar or different to any of the other groups mentioned. Each group is different from each other and each is suitable for different applications. Lignin is a complex, heterogenous material composed of up to three different phenyl propane monomers, depending on the source. Softwood lignins are made mostly with units of coniferyl alcohol, see FIG. 5 and as a result, they are more homogeneous than hardwood lignins, which has a higher content of syringyl alcohol, see FIG. 5. The appearance and consistency of lignin are quite variable and highly contingent on process.

A summary of the properties of these technical lignins is shown in FIG. 7.

Lignosulfonate from the sulfite pulping process remains the largest commercial available source of lignin, with capacity of 1.4 million tonnes. But taking these aside, the kraft process is currently the most used pulping process and is gradually replacing the sulfite process. An estimated 78 million tonnes per year of lignin are globally generated by kraft pulp production but most of it is burned for steam and energy. Current capacity for kraft recovery is estimated at 160,000 tonnes, but sources indicate that current recovery is only about 75,000 tonnes. Kraft lignin is developed from black liquour, the spent liquor from the sulfate or kraft process. At the moment, 3 well-known processes are used to produce the kraft lignin: LignoBoost, LignoForce and SLRP. These 3 processes are similar in that they involve the addition of $CO_2$ to reduce the pH to 9-10, followed by acidification to reduce pH further to approximately 2. The final step involves some combination of washing, leaching and filtration to remove ash and other contaminants. The three processes are in various stages of commercialization globally.

The kraft process introduces thiol groups, stilbene while some carbohydrates remain. Sodium sulphate is also present as an impurity due to precipitation of lignin from liquor with sulphuric acid but can potentially be avoided by altering the way lignin is isolated. The kraft process leads to high amount of phenolic hydroxyl groups and this lignin is soluble in water when these groups are ionized (above pH~10).

Commercial kraft lignin is generally higher in purity than lignosulfonates. The molecular weight are 1000-3000 g/mol·s Soda lignin originates from sodium hydroxide pulping processes, which are mainly used for wheat straw, bagasse and flax. Soda lignin properties are similar to kraft lignins one in terms of solubility and glass transition temperature ($T_g$). This process does not utilize sulphur and there is no covalently bound sulphur. The ash level is very low. Soda lignin has a low solubility in neutral and acid media but is completely soluble at pH 12 and higher.

The lignosulfonate process introduces large amount of sulphonate groups making the lignin soluble in water but also in acidic water solutions. Lignosulfonates has up to 8% sulfur as sulphonate, whereas kraft lignin has 1-2% sulfur, mostly bonded to the lignin. The molecular weight of lignosulfonate is 15.000-50.000 g/mol. This lignin contains more leftover carbohydrates compared to other types and has a higher average molecular weight. The typical hydrophobic core of lignin together with large number of ionized sulphonate groups make this lignin attractive as a surfactant and it often finds application in dispersing cement etc.

A further group of lignins becoming available is lignins resulting from biorefining processes in which the carbohydrates are separated from the lignin by chemical or biochemical processes to produce a carbohydrate rich fraction. This remaining lignin is referred to as biorefinery lignin. Biorefineries focus on producing energy, and producing substitutes for products obtained from fossil fuels and petrochemicals as well as lignin. The lignin from this process is in general considered a low value product or even a waste product mainly used for thermal combustion or used as low grade fodder or otherwise disposed of.

Organosolv lignin availability is still considered on the pilot scale. The process involves extraction of lignin by using water together with various organic solvents (most often ethanol) and some organic acids. An advantage of this process is the higher purity of the obtained lignin but at a much higher cost compared to other technical lignins and with the solubility in organic solvents and not in water.

Previous attempts to use lignin as a basic compound for binder compositions for mineral fibres failed because it proved difficult to find suitable cross-linkers which would achieve desirable mechanical properties of the cured mineral wool product and at the same time avoid harmful and/or corrosive components. Presently lignin is used to replace oil derived chemicals, such as phenol in phenolic resins in binder applications or in bitumen. It is also used as cement and concrete additives and in some aspects as dispersants.

The cross-linking of a polymer in general should provide improved properties like mechanical, chemical and thermal resistance etc. Lignin is especially abundant in phenolic and aliphatic hydroxyl groups that can be reacted leading to cross-linked structure of lignin. Different lignins will also have other functional groups available that can potentially be used. The existence of these other groups is largely dependent on the way lignin was separated from cellulose and hemicellulose (thiols in kraft lignin, sulfonates in lignosulfonate etc.) depending on the source.

It has been found that by using oxidized lignins, binder compositions for mineral fibres can be prepared which allow excellent properties of the mineral fibre product produced.

In one embodiment, the component (i) is in the form of one or more oxidized kraft lignins.

In one embodiment, the component (i) is in the form of one or more oxidized soda lignins.

In one embodiment, the component (i) is in the form of one or more ammonia-oxidized lignins. For the purpose of the present invention, the term "ammonia-oxidized lignins" is to be understood as a lignin that has been oxidized by an oxidation agent in the presence of ammonia. The term "ammonia-oxidized lignin" is abbreviated as AOL.

In an alternative embodiment, the ammonia is partially or fully replaced by an alkali metal hydroxide, in particular sodium hydroxide and/or potassium hydroxide.

A typical oxidation agent used for preparing the oxidized lignins is hydrogen peroxide.

In one embodiment, the ammonia-oxidized lignin comprises one or more of the compounds selected from the group of ammonia, amines, hydroxides or any salts thereof.

In one embodiment, the component (i) has a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component In one embodiment, the component (i) has an average carboxylic acid group content of more than 1.5 groups per macromolecule of component (i), such as more than 2 groups, such as more than 2.5 groups.

It is believed that the carboxylic acid group content of the oxidized lignins plays an important role in the surprising advantages of the aqueous binder compositions for mineral fibres according to the present invention. In particular, it is believed that the carboxylic acid group of the oxidized lignins improve the cross-linking properties and therefore allow better mechanical properties of the cured mineral fibre products.

Component (ii)

Component (ii) is in the form of one or more cross-linkers.

In one embodiment, the component (ii) comprises one or more cross-linkers selected from β-hydroxyalkylamide-cross-linkers and/or oxazoline-cross-linkers.

β-hydroxyalkylamide-cross-linkers are curing agents for the acid-functional macromolecules. They provide a hard, durable, corrosion resistant and solvent resistant cross-linked polymer network. It is believed the β-hydroxyalkylamide cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing crosslinkers can easily be obtained by polymerizing an oxazoline derivative. The U.S. Pat. No. 6,818,699 $B_2$, which is hereby incorporated by reference herein in its entirety, provides a disclosure for such a process.

In one embodiment, the component (ii) is an epoxidised oil based on fatty acid triglyceride.

It is noted that epoxidised oils based on fatty acid triglycerides are not considered hazardous and therefore the use of these compounds in the binder compositions according to the present invention do not render these compositions unsafe to handle.

In one embodiment, the component (ii) is a molecule having 3 or more epoxy groups.

In one embodiment, the component (ii) is one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups.

In one embodiment, component (ii) is selected from the group consisting of cross-linkers taking part in a curing reaction, such as hydroxyalkylamide, alkanolamine, a reaction product of an alkanolamine and a polycarboxylic acid. The reaction product of an alkanolamine and a polycarboxylic acid can be found in U.S. Pat. No. 6,706,853$B_1$, which is hereby incorporated by reference herein in its entirety.

Without wanting to be bound by any particular theory, the present inventors believe that the very advantageous properties of the aqueous binder compositions are due to the interaction of the oxidized lignins used as component (i) and the cross-linkers mentioned above (component (ii)). It is believed that the presence of carboxylic acid groups in the oxidized lignins enable the very effective cross-linking of the oxidized lignins.

In one embodiment, the component (ii) is one or more cross-linkers selected from the group consisting of multifunctional organic amines such as an alkanolamine, diamines, such as hexamethyldiamine, and triamines.

In one embodiment, the component (ii) is one or more cross-linkers selected from the group consisting of polyethylene imine, polyvinyl amine, and fatty amines.

In one embodiment, the component (ii) is one or more fatty amides.

In one embodiment, the component (ii) is one or more cross-linkers selected from the group consisting of dimethoxyethanal, glycolaldehyde, and glyoxalic acid.

In one embodiment, the component (ii) is one or more cross-linkers selected from polyester polyols, such as polycaprolactone.

In one embodiment, the component (ii) is one or more cross-linkers selected from the group consisting of starch, modified starch, and carboxymethyl cellulose (CMC).

In one embodiment, the component (ii) is one or more cross-linkers in form of aliphatic multifunctional carbodiimides.

In one embodiment, the component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

Component (ii) can also be any mixture of the above mentioned compounds.

In one embodiment, the binder composition according to the present invention comprises component (ii) in an amount of 1 to 40 wt.-%, such as 4 to 20 wt.-%, such as 6 to 12 wt.-%, based on the dry weight of component (i).

Component (iii)

Component (iii) is in the form of one or more plasticizers.

In one embodiment, component (iii) is in the form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in the form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in the form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanillin, acetosyringone.

In one embodiment, component (iii) is in the form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers.

Another particular surprising aspect of the present invention is that the use of plasticizers having a boiling point of more than 100° C., in particular 140 to 250° C., strongly improves the mechanical properties of the mineral fibre products according to the present invention, although, in view of their boiling point, it is likely that these plasticizers will at least in part evaporate during the curing of the aqueous binders in contact with the mineral fibres.

In one embodiment, component (iii) comprises one or more plasticizers having a boiling point of more than 100° C., such as 110 to 280° C., more preferably 120 to 260° C., even more preferably 140 to 250° C.

It is believed that the effectiveness of these plasticizers in the aqueous binder composition is associated with the effect of increasing the mobility of the oxidized lignins during the curing process. It is believed that the increased mobility of the lignins or oxidized lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and would remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

It has surprisingly been found that the inclusion of plasticizers in the aqueous binder compositions strongly improves the mechanical properties of the growth substrate according to the invention.

The term plasticizer refers to a substance that is added to a material in order to make the material softer, more flexible (by decreasing the glass-transition temperature $T_g$) and easier to process.

Component (iii) can also be any mixture of the above mentioned compounds.

In one embodiment, component (iii) is present in an amount of 0.5 to 50 wt %, preferably 2.5 to 25 wt %, more preferably 3 to 15 wt.-%, based on the dry weight of component (i).

Aqueous Binder Composition for Mineral Fibers Comprising Components (i) and (IIa)

In one embodiment the present invention is directed to an aqueous binder composition for mineral fibers comprising:
 a component (i) in the form of one or more oxidized lignins; and
 a component (iia) in the form of one or more modifiers.

The present inventors have found that the excellent binder properties can also be achieved by a two-component system, which comprises component (i) in the form of one or more oxidized lignins and a component (iia) in the form of one or more modifiers, and optionally any of the other components mentioned above and below (e.g. component (ii) and/or component (iii)).

In one embodiment, component (iia) is a modifier in the form of one or more compounds selected from the group consisting of epoxidised oils based on fatty acid triglycerides.

In one embodiment, component (iia) is a modifier in the form of one or more compounds selected from molecules having 3 or more epoxy groups.

In one embodiment, component (iia) is a modifier in the form of one or more flexible oligomer or polymer, such as a low $T_g$ acrylic based polymer, such as a low $T_g$ vinyl based polymer, such as low $T_g$ polyether, which contains reactive functional groups such as carbodiimide groups, such as anhydride groups, such as oxazoline groups, such as amino groups, such as epoxy groups.

In one embodiment, component (iia) is one or more modifiers selected from the group consisting of polyethylene imine, polyvinyl amine, fatty amines.

In one embodiment, the component (iia) is one or more modifiers selected from aliphatic multifunctional carbodiimides.

Component (iia) can also be any mixture of the above mentioned compounds.

Without wanting to be bound by any particular theory, the present inventors believe that the excellent binder properties achieved by the binder composition for mineral fibers comprising components (i) and (iia), and optional further components, are at least partly due to the effect that the modifiers used as components (iia) at least partly serve the function of a plasticizer and a crosslinker.

In one embodiment, the aqueous binder composition comprises component (iia) in an amount of 1 to 40 wt.-%, such as 4 to 20 wt.-%, such as 6 to 12 wt.-%, based on the dry weight of the component (i).

Further Components

In some embodiments, the aqueous binder composition comprises further components.

In one embodiment, the aqueous binder composition comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid. The presence of such a catalyst can improve the curing properties of the aqueous binder compositions.

In one embodiment, the aqueous binder composition comprises a catalyst selected from Lewis acids, which can accept an electron pair from a donor compound forming a Lewis adduct, such as $ZnCl_2$, $Mg(ClO_4)_2$, $Sn[N(SO_2\text{-n-}C8F17)_2]_4$.

In one embodiment, the aqueous binder composition comprises a catalyst selected from metal chlorides, such as $KCl$, $MgCl_2$, $ZnCl_2$, $FeCl_3$ and $SnCl_2$.

In one embodiment, the aqueous binder composition comprises a catalyst selected from organometallic compounds, such as titanate-based catalysts and stannum based catalysts.

In one embodiment, the aqueous binder composition comprises a catalyst selected from chelating agents, such as transition metals, such as iron ions, chromium ions, manganese ions, copper ions.

In one embodiment, the aqueous binder composition further comprises a further component (iv) in the form of one or more silanes.

In one embodiment, the aqueous binder composition comprises a further component (iv) in the form of one or more coupling agents, such as organofunctional silanes.

In one embodiment, component (iv) is selected from the group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the aqueous binder composition further comprises a component (v) in the form of one or more components selected from the group of ammonia, amines or any salts thereof.

The present inventors have found that the inclusion of ammonia, amines or any salts thereof as a further component can in particular be useful when oxidized lignins are used in component (i), which oxidised lignin have not been oxidized in the presence of ammonia.

In one embodiment, the aqueous binder composition further comprises a further component in form of urea, in particular in an amount of 5 to 40 wt.-%, such as 10 to 30 wt.-%, 15 to 25 wt.-%, based on the dry weight of component (i).

In one embodiment, the aqueous binder composition further comprises a further component in the form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the aqueous binder composition further comprises a further component in the form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context of the present invention, a binder composition having a sugar content of 50 wt.-% or more, based on the total dry weight of the binder components, is considered to be a sugar based binder. In the context of the present invention, a binder composition having a sugar content of less than 50 wt.-%, based on the total dry weight of the binder components, is considered a non-sugar based binder.

In one embodiment, the aqueous adhesive further comprises a further component in form of one or more surface active agents that are in the form of non-ionic and/or ionic emulsifiers such as polyoxyethylenes (4) lauryl ether, such as soy lecithin, such as sodium dodecyl sulfate.

In one embodiment, the aqueous binder composition comprises
  a component (i) in the form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
  a component (ii) in the form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines; and
  a component (iii) in the form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous binder composition comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the aqueous binder composition comprises
  a component (i) in the form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i); and
  a component (iia) in the form of one or more modifiers selected from epoxidised oils based on fatty acid triglycerides.

In one embodiment, the aqueous binder composition comprises
  a component (i) in the form of one or more ammonia-oxidized lignins having an average carboxylic acid group content of more than 1.5 groups per macromolecule of component (i), such as more than 2 groups, such as more than 2.5 groups;
  a component (ii) in the form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines; and
  a component (iii) in the form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous binder composition comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the aqueous binder composition comprises
  a component (i) in the form of one or more ammonia-oxidized lignins having an average carboxylic acid group content of more than 1.5 groups per macromolecule of component (i), such as more than 2 groups, such as more than 2.5 groups; and
  a component (iia) in the form of one or more modifiers selected from epoxidised oils based on fatty acid triglycerides.

In one embodiment, the aqueous binder composition consists essentially of
  a component (i) in the form of one or more oxidized lignins;
  a component (ii) in the form of one or more cross-linkers;
  a component (iii) in the form of one or more plasticizers;
  a component (iv) in the form of one or more coupling agents, such as organofunctional silanes;
  optionally a component in the form of one or more compounds selected from the group of ammonia, amines or any salts thereof;
  optionally a component in the form of urea;
  optionally a component in the form of a more reactive or non-reactive silicones;
  optionally a hydrocarbon oil;
  optionally one or more surface active agents; and
  water.

In one embodiment, the aqueous binder composition consists essentially of
  a component (i) in the form of one or more oxidized lignins;
    a component (iia) in the form of one or more modifiers selected from epoxidised oils based on fatty acid triglycerides;
    a component (iv) in the form of one or more coupling agents, such as organofunctional silanes;

optionally a component in the form of one or more compounds selected from the group of ammonia, amines or any salts thereof;

optionally a component in the form of urea;

optionally a component in the form of a more reactive or non-reactive silicones;

optionally a hydrocarbon oil;

optionally one or more surface active agents; and water.

Preferably the growth substrate comprises 1.0 wt % to 6.0 wt % of the cured binder composition, preferably 2.0 wt % to 4.5 wt %, most preferably 2.5 wt % to 3.5 wt % based on the weight of the growth substrate. Determination of binder content is performed according to DS/EN13820:2003. The binder content is taken as the loss on ignition. The binder content includes any binder additives.

The above-described oxidized lignins in the aqueous binder composition can be prepared as follows.

Method I to Prepare Oxidised Lignins

Oxidised lignins, which can be used as a component for the binders used in embodiments of the present invention can be prepared by a method comprising bringing into contact a component (a) comprising one or more lignins, a component (b) comprising ammonia, one or more amine components, and/or any salt thereof, and a component (c) comprising one or more oxidation agents.

Component (a)

Component (a) comprises one or more lignins.

In one embodiment, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment, component (b) comprises ammonia, one or more amino components, and/or any salts thereof. Without wanting to be bound by any particular theory, the present inventors believe that replacement of the alkali hydroxides used in previously known oxidation processes of lignin by ammonia, one or more amino components, and/or any salts thereof, plays an important role in the improved properties of the oxidised lignins prepared according to the method of the present invention.

The present inventors have surprisingly found that the lignins oxidised by an oxidation agent in the presence of ammonia or amines contain significant amounts of nitrogen as a part of the structure of the oxidised lignins. Without wanting to be bound to any particular theory, the present inventors believe that the improved fire resistance properties of the oxidised lignins when used in products where they are comprised in a binder composition, said oxidised lignins prepared by the method described herein, are at least partly due to the nitrogen content of the structure of the oxidised lignins.

In one embodiment, component (b) comprises ammonia and/or any salt thereof.

Without wanting to be bound by any particular theory, the present inventors believe that the improved stability properties of the derivatized lignins prepared according to the present invention are at least partly due to the fact that ammonia is a volatile compound and therefore evaporates from the final product or can be easily removed and reused.

In contrast to that, it has proven difficult to remove residual amounts of the alkali hydroxides used in the previously known oxidation process.

Nevertheless, it can be advantageous in the method that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method described herein, component (c) comprises one or more oxidation agents.

In one embodiment, component (c) comprises one or more oxidation agents in form of hydrogen peroxide, organic or inorganic peroxides, molecular oxygen, ozone, air, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

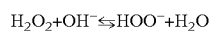

$$H_2O_2 + OH^- \leftrightarrows HOO^- + H_2O$$

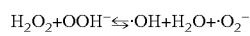

$$H_2O_2 + OOH^- \leftrightarrows \cdot OH + H_2O + O_2^-$$

The present inventors have found that the derivatized lignins prepared with the method described herein contain increased amounts of carboxylic acid groups as a result of the oxidation process. Without wanting to be bound by any particular theory, the present inventors believe that the carboxylic acid group content of the oxidised lignins prepared in the process plays an important role in the desirable reactivity properties of the derivatized lignins prepared by the method described herein.

Another advantage of the oxidation process is that the oxidised lignin is more hydrophilic. Higher hydrophilicity can enhance solubility in water and facilitate the adhesion to polar substrates such as mineral fibers.

Further Components

In one embodiment, the method of preparing oxidised lignins preferably comprises further components, in particular a component (d) in the form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidised lignins.

Mass Ratios of the Components

The person skilled in the art will use the components (a), (b) and (c) in relative amounts that the desired degree of oxidation of the lignins is achieved.

In one embodiment,
a component (a) comprises one or more lignins,
a component (b) comprises ammonia, AND
a component (c) comprises one or more oxidation agents in form of hydrogen peroxide,
wherein the mass ratios of lignin, ammonia and hydrogen peroxide are such that the amount of ammonia is 0.01 to 0.5 weight parts, such as 0.1 to 0.3, such as 0.15 to 0.25 weight parts ammonia, based on the dry weight of lignin, and wherein the amount of hydrogen peroxide is 0.025 to 1.0 weight parts, such as 0.05 to 0.2 weight parts, such as 0.075 to 0.125 weight parts hydrogen peroxide, based on the dry weight of lignin.

Process

There is more than one possibility to bring the components (a), (b) and (c) in contact to achieve the desired oxidation reaction.

In one embodiment, the method comprises the steps of:
a step of providing component (a) in the form of an aqueous solution and/or dispersion of one more lignins, the lignin content of the aqueous solution being 1 to 50 weight-%, such as 5 to 25 weight-%, such as 15 to 22 weight-%, such as 18 to 20 weight-%, based on the total weight of the aqueous solution;
a pH adjusting step by adding component (b) comprising an aqueous solution of ammonia, one or more amine components, and/or any salt thereof; and
an oxidation step by adding component (c) comprising an oxidation agent.

In one embodiment, the pH adjusting step is carried so that the resulting aqueous solution and/or dispersion is having a pH 9, such as 10, such as 10.5.

In one embodiment, the pH adjusting step is carried out so that the resulting aqueous solution and/or dispersion is having a pH in the range of 10.5 to 12.

In one embodiment, the pH adjusting step is carried out so that the temperature is allowed to raise to 25° C. and then controlled in the range of 25-50° C., such as 30-45° C., such as 35-40° C.

In one embodiment, during the oxidation step, the temperature is allowed to raise 35° C. and is then controlled in the range of 35-150° C., such as 40-90° C., such as 45-80° C.

In one embodiment, the oxidation step is carried out for a time of 1 second to 48 hours, such as 10 seconds to 36 hours, such as 1 minute to 24 hours such as 2-5 hours.

Method II to Prepare Oxidised Lignins

Oxidised lignins, which are used as component for the binders used in the present invention can be prepared by a method comprising bringing into contact
a component (a) comprising one or more lignins,
a component (b) comprising ammonia and/or one or more amine components, and/or any salt thereof and/or an alkali and/or earth alkali metal hydroxide, such as sodium hydroxide and/or potassium hydroxide,
a component (c) comprising one or more oxidation agents, and
a component (d) in the form of one or more plasticizers.

Component (a)

Component (a) comprises one or more lignins.

In one embodiment of the method of preparing oxidised lignins, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment of preparing oxidised lignins, component (b) comprises ammonia, one or more amino components, and/or any salts thereof and/or an alkali and/or earth alkali metal hydroxide, such as sodium hydroxide and/or potassium hydroxide.

"Ammonia-oxidized lignins" is to be understood as a lignin that has been oxidized by an oxidation agent in the presence of ammonia. The term "ammonia-oxidized lignin" is abbreviated as AOL.

In one embodiment, component (b) comprises ammonia and/or any salt thereof.

Without wanting to be bound by any particular theory, the present inventors believe that the improved stability properties of the derivatized lignins prepared according to the present invention with component (b) being ammonia and/or any salt thereof are at least partly due to the fact that ammonia is a volatile compound and therefore evaporates from the final product or can be easily removed and reused.

Nevertheless, it can be advantageous in this embodiment of the method of preparing oxidised lignins that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method of preparing oxidised lignins, component (c) comprises one or more oxidation agents.

In one embodiment, component (c) comprises one or more oxidation agents in form of hydrogen peroxide, organic or inorganic peroxides, molecular oxygen, ozone, air, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism, multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

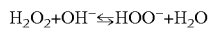

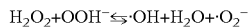

The present inventors have found that the derivatized lignins prepared with the method described herein contain increased amounts of carboxylic acid groups as a result of the oxidation process. Without wanting to be bound by any particular theory, the present inventors believe that the carboxylic acid group content of the oxidized lignins prepared in the process according to the present invention plays an important role in the desirable reactivity properties of the derivatized lignins prepared by the method described herein.

Another advantage of the oxidation process is that the oxidized lignin is more hydrophilic. Higher hydrophilicity can enhance solubility in water and facilitate the adhesion to polar substrates such as mineral fibres.

Component (d)

Component (d) comprises one or more plasticizers.

In one embodiment, component (d) comprises one or more plasticizers in the form of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

The present inventors have found that the inclusion of component (d) in form of one or more plasticizers provides a decrease of the viscosity of the reaction mixture which allows a very efficient method to produce oxidised lignins.

In one embodiment according to the present invention, component (d) comprises one or more plasticizers in the form of polyols, such as carbohydrates, hydrogenated sugars, such as sorbitol, erythriol, glycerol, monoethylene glycol, polyethylene glycols, polyvinyl alcohol, acrylic based polymers with free carboxy groups and/or polyurethane dispersions with free carboxy groups, polyamides, amides such as carbamide/urea, or any mixtures thereof.

In one embodiment according to the present invention, component (d) comprises one or more plasticizers selected from the group of polyethylene glycols, polyvinyl alcohol, urea or any mixtures thereof.

Further Components

In one embodiment, the method of preparing oxidised lignins preferably comprises further components, in particular a component (v) in the form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidized lignins prepared by the method.

Mass Ratios of the Components

The person skilled in the art will use the components (a), (b), (c), and (d) in relative amounts that the desired degree of oxidation of the lignins is achieved.

In one embodiment, the method is carried out such that the method comprises a component (a) comprises one or more lignins,
a component (b) comprises ammonia,
a component (c) comprises one more oxidation agents in form of hydrogen peroxide, and
a component (d) comprises one or more plasticizers comprising polyethylene glycol,
wherein the mass ratios of lignin, ammonia, hydrogen peroxide and polyethylene glycol are such that the amount of ammonia is 0.01 to 0.5 weight parts, such as 0.1 to 0.3, such as 0.15 to 0.25 weight parts ammonia (25 weight % solution in water), based on the dry weight of lignin, and wherein the amount of hydrogen peroxide (30 weight % solution in water) is 0.025 to 1.0 weight parts, such as 0.07 to 0.50 weight parts, such as 0.15 to 0.30 weight parts hydrogen peroxide, based on the dry weight of lignin, and wherein the amount of polyethylene glycol is 0.03 to 0.60 weight parts, such as 0.07 to 0.50 weight parts, such as 0.10 to 0.40 weight parts polyethylene glycol, based on the dry weight of lignin.

For the purpose of the present invention, the "dry weight of lignin" is preferably defined as the weight of the lignin in the supplied form.

Process

There is more than one possibility to bring the components (a), (b), (c), and (d) in contact to achieve the desired oxidation reaction.

In one embodiment, the method comprises the steps of:
a step of providing component (a) in form of an aqueous solution and/or dispersion of one more lignins, the lignin content of the aqueous solution being 5 to 90 weight-%, such as 10 to 85 weight-%, such as 15 to 70 weight-%, based on the total weight of the aqueous solution;
a pH adjusting step by adding component (b);
a step of adding component (d); and
an oxidation step by adding component (c) comprising an oxidation agent.

In one embodiment, the pH adjusting step is carried so that the resulting aqueous solution and/or dispersion is having a pH ≥9, such as ≥10, such as ≥10.5.

In one embodiment, the pH adjusting step is carried out so that the resulting aqueous solution and/or dispersion is having a pH in the range of 9.5 to 12.

In one embodiment, the pH adjusting step is carried out so that the temperature is allowed to raise to ≥25° C. and then controlled in the range of 25-50° C., such as 30-45° C., such as 35-40° C.

In one embodiment, during the oxidation step, the temperature is allowed to raise to ≥35° C. and is then controlled in the range of 35-150° C., such as 40-90° C., such as 45-80° C.

In one embodiment, the oxidation step is carried out for a time of 1 seconds to 24 hours, such as 1 minutes to 12 hours, such as 10 minutes to 8 hours, such as 5 minutes to 1 hour.

The present inventors have found that the process as described herein allows to produce a high dry matter content of the reaction mixture and therefore a high throughput is possible in the process according to the present invention which allows the reaction product in form of the oxidised lignins to be used as a component in industrial mass production products such as mineral fibre products.

In one embodiment, the method is carried out such that the dry matter content of the reaction mixture is 20 to 80 wt. %, such as 40 to 70 wt. %.

In one embodiment, the method is carried out such that the viscosity of the oxidised lignin has a value of 100 cP to 100.000 cP, such as a value of 500 cP to 50.000 cP, such as a value of 1.000 cP to 25.000 cP.

For the purpose of the present invention, viscosity is dynamic viscosity and is defined as the resistance of the liquid/paste to a change in shape, or movement of neighbouring portions relative to one another. The viscosity is measured in centipoise (cP), which is the equivalent of 1 mPa s (milipascal second). Viscosity is measured at 20° C. using a viscometer. For the purpose of the present invention, the dynamic viscosity can be measured at 20° C. by a Cone Plate Wells Brookfield Viscometer.

In one embodiment, the method is carried out such that the method comprises a rotator-stator device.

In one embodiment, the method is carried out such that the method is performed as a continuous or semi-continuous process.

Apparatus for Performing the Method

The present invention is also directed to an apparatus for performing the method described above.

In one embodiment, the apparatus for performing the method comprises:
- a rotor-stator device;
- a premixing device for component (a), (b), and (d);
- one or more inlets for water, components (a), (b), (c) and (d); and
- one or more outlets for an oxidised lignin.

In one embodiment, the apparatus is constructed in such a way that the inlets for the premix of the components (a), (b) and (d) are to the rotor-stator device and the apparatus furthermore comprises a chamber,
- said chamber having an inlet for component (c), and
- said chamber having an outlet for an oxidised lignin.

A rotator-stator device is a device for processing materials comprising a stator configured as an inner cone provided with gear rings. The stator cooperates with a rotor having arms projecting from a hub. Each of these arms bears teeth meshing with the teeth of the gear rings of the stator. With each turn of the rotor, the material to be processed is transported farther outward by one stage, while being subjected to an intensive shear effect, mixing and redistribution. The rotor arm and the subjacent container chamber of the upright device allow for a permanent rearrangement of the material from the inside to the outside and provide for a multiple processing of dry and/or highly viscous matter so that the device is of excellent utility for the intensive mixing, kneading, fibrillating, disintegrating and similar processes important in industrial production. The upright arrangement of the housing facilitates the material's falling back from the periphery toward the center of the device.

In one embodiment, the rotator-stator device used in the method according to the present invention comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the center.

For more details of the rotator-stator device to be used in one embodiment of the method, reference is made to US 2003/0042344 A1, which is hereby incorporated herein by reference in its entirety.

In one embodiment, the method is carried out such that the method uses one rotator-stator device. In this embodiment, the mixing of the components and the reaction of the components is carried out in the same rotator-stator device.

In one embodiment, the method is carried out such that the method uses two or more rotator-stator devices, wherein at least one rotator-stator device is used for the mixing of the components and at least one rotator-stator device is used for reacting the components.

This process can be divided into two steps:
1. Preparation of the Lignin mass (a)+(b)+(d); and
2. Oxidization of the lignin mass.

Typically, two different types of rotor-/stator machines are used:
1. Open rotor-/stator machine suitable for blending in the lignin powder into water on a very high concentration (30 to 50 wt-%). Less intensive mixing but special auxiliaries (inlet funnel, screw etc.) to handle highly viscous materials. Lower circumferential speed (up to 15 m/s). The machine can be used as batch system or continuous.
2. Inline rotor-/stator machine which has much higher shear forces—circumferential speeds of up to 55 m/s—and creates beneficial conditions for a very quick chemical reaction. The machine is to be used continuously.

In the open rotor-/stator system the highly concentrated (45 to 50 wt-%) mass of Lignin/water is prepared. The lignin powder is added slowly to the warm water (30 to 60 deg. C.) in which the correct amount of watery ammonia and/or alkali base have been added. This can be done in batch mode, or the materials are added intermittently/continuously creating a continuous flow of mass to the next step.

The created mass should be kept at a temperature of about 60 deg C. to keep the viscosity as low as possible and hence the material pumpable. The hot mass of lignin/water at a pH of 9 to 12 is then transferred using a suitable pump, e.g. progressive cavity pump or another volumetric pump, to the oxidation step.

In on embodiment the oxidation is done in a closed rotor-/stator system in a continuous inline reaction. A watery solution of ammonia and/or alkali base is dosed with a dosing pump into the rotor-/stator chamber at the point of highest turbulence/shear. This ensures a rapid oxidation reaction. The oxidized material (AOL) leaves the inline-reactor and is collected in suitable tanks.

Reaction Product

The present inventors have surprisingly found that the oxidized lignins prepared have very desirable reactivity properties and at the same time display improved fire resistance properties when used in products where they are comprised in a binder composition, and improved long term stability over previously known oxidized lignins.

The oxidised lignin also displays improved hydrophilicity.

An important parameter for the reactivity of the oxidized lignins prepared is the carboxylic acid group content of the oxidized lignins.

In one embodiment, the oxidized lignin prepared has a carboxylic acid group content of 0.05 to 10 mmol/g, such as 0.1 to 5 mmol/g, such as 0.20 to 2.0 mmol/g, such as 0.40 to 1.5 mmol/g, such as 0.45 to 1.0 mmol/g, based on the dry weight of component (a).

Another way to describe the carboxylic acid group content is by using average carboxylic acid group content per lignin macromolecule according to the following formula:

$$\text{Average COOH functionality} = \frac{\text{total moles COOH}}{\text{total moles lignin}}$$

In one embodiment, the oxidized lignin prepared has an average carboxylic acid group content of more than 1.5 groups per macromolecule of component (a), such as more than 2 groups, such as more than 2.5 groups.

Method III to Prepare Oxidised Lignins

Oxidised lignins, which are used as a component for the binder used in the present invention can be prepared by a method comprising bringing into contact
- a component (a) comprising one or more lignins,
- a component (b) comprising ammonia and/or one or more amine components, and/or any salt thereof and/or an alkali and/or earth alkali metal hydroxide, such as sodium hydroxide and/or potassium hydroxide,
- a component (c) comprising one or more oxidation agents,
- optionally a component (d) in the form of one or more plasticizers, and allowing a mixing/oxidation step, wherein an oxidised mixture is produced, followed by an oxidation step, wherein the oxidised mixture is allowed to continue to react for a dwell time of dwell time of 1 second to 10 hours, such as 10 seconds to 6 hours, such as 30 seconds to 2 hours.

Components (a), (b), (c) and (d) are as defined above under Method II to prepare oxidised lignins.

In one embodiment, the process comprises a premixing step in which components are brought into contact with each other.

In the premixing step the following components can be brought into contact with each other:
- component (a) and component (b), or
- component (a) and component (b) and component (c), or
- component (a) and component (b) and component (d), or
- component (a) and component (b) and component (c) and component (d).

In an embodiment, it is possible that the premixing step is carried out as a separate step and the mixing/oxidation step is carried out subsequently to the premixing step. In such an embodiment of the invention it is particularly advantageous to bring component (a) and component (b) and optionally component (d) into contact with each other in a premixing step. In a subsequent mixing/oxidation step, component (c) is then added to the premixture produced in the premixing step.

In an embodiment, it is possible that the premixing step corresponds to the mixing/oxidation step. In this embodiment of the invention, the components, for example component (a), component (b) and component (c) are mixed and an oxidation process is started at the same time. It is possible that the subsequent dwell time is performed in the same device as that used to perform the mixing/oxidation step. Such an implementation of the invention is particularly advantageous if component (c) is air.

The present inventors have found out that by allowing a mixing/oxidation step followed by an oxidation step, in which the reaction mixture is preferably not continued to be mixed, the oxidation rate can be controlled in a very efficient manner. At the same time, the costs for performing the method are reduced because the oxidation step subsequent to the mixing/oxidation step requires less complex equipment.

Another advantage is that oxidized lignin, which is produced is particularly stable. Another surprising advantage is that the oxidized lignin produced is very well adjustable in terms of viscosity. Another surprising advantage is that the concentration of the oxidized lignin can be very high.

In one embodiment, the dwell time is so chosen that the oxidation reaction is brought to the desired degree of completion, preferably to full completion.

System I for Performing the Method III

In one embodiment, the system for performing the method comprises:
- at least one rotor-stator device,
- one or more inlets for water and components (a) and (b),
- one or more outlets of the rotor-stator device, and
- at least one reaction device, in particular at least one reaction tube, which is arranged downstream in the process flow direction to at least one or more of the outlets.

In one embodiment, the system comprises one or more inlets for component (c) and/or component (d).

In one embodiment, the system comprises a premixing device.

The premixing device can comprise one or more inlets for water and/or component (a) and/or component (b) and/or component (c) and/or component (d).

In one embodiment of the invention, the premixing device comprises inlets for water and component (a) and component (b).

It is possible that, in a premixing step, component (c) is also mixed with the three mentioned ingredients (water, component (a) and component (b)). It is then possible that the premixing device has a further inlet for component (c). If component (c) is air, it is possible that the premixing device is formed by an open mixing vessel, so that in this case component (c) is already brought into contact with the other components (water, component (a) and component (b)) through the opening of the vessel. Also in this embodiment of the invention, it is possible that the premixing device optionally comprises an inlet for component (d).

In one embodiment, the system is constructed in such a way that the inlets for components (a), (b) and (d) are inlets of a premixing device, in particular of an open rotor-stator device,
- whereby the system furthermore comprises an additional rotor-stator device,
- said additional rotor-stator device having an inlet for component (c) and said additional rotor-stator device having an outlet for an oxidized lignin.

It is possible that the premixing step and the mixing/oxidizing step are carried out simultaneously. In this case, the premixing device and the mixing/oxidizing device are a single device, i.e. a rotor-stator device.

In one embodiment, one rotator-stator device used in the method according to the present invention comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the center.

System II for Performing the Method III

In one embodiment, the system for performing the method comprises:
- one or more inlets for water, components (a) and (b),
- at least one mixing and oxidizing apparatus with one or more outlets, and
- at least one mixer/heat-exchanger, which is arranged downstream in the process flow direction to the at least one or more of the outlets, whereby the mixer/heat-exchanger comprises a temperature control device.

In one embodiment, the system comprises additional one or more inlets for component (c) and/or component (d).

In one embodiment, the system comprises a premixing device.

The premixing device can comprise one or more inlets for water and/or component (a) and/or component (b) and/or component (c) and/or component (d).

In one embodiment, the premixing device comprises inlets for water and component (a) and component (b).

It is possible that, in a premixing step, component (c) is also mixed with the three mentioned ingredients (water, component (a) and component (b)). It is then possible that the premixing device has a further inlet for component (c). If component (c) is air, it is possible that the premixing device is formed by an open mixing vessel, so that in this case component (c) is already brought into contact with the other components (water, component (a) and component (b)) through the opening of the vessel. Also in this embodiment of the invention, it is possible that the premixing device optionally comprises an inlet for component (d).

In one embodiment, the system is constructed in such a way that the inlets for components (a), (b) and (d) are inlets of an open rotor-stator device,
- whereby the system furthermore comprises a mixer/heat-exchanger, having an inlet for component (c) and an outlet for an oxidized lignin.

It is possible that the premixing step and the mixing/oxidizing step are carried out simultaneously. In this case, the premixing device and the mixing/oxidizing device are a single device.

In one embodiment, one rotator-stator device used in the method according to the present invention comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the center.

Of course other devices can also be used as premixing devices. Furthermore, it is possible that the premixing step is carried out in the mixing and oxidizing apparatus.

In one embodiment, the mixing and oxidizing apparatus is a static mixer. A static mixer is a device for the continuous mixing of fluid materials, without moving components. One design of static mixer is the plate-type mixer and another common device type consists of mixer elements contained in a cylindrical (tube) or squared housing.

In one embodiment, the mixer/heat-exchanger is constructed as multitube heat exchanger with mixing elements. The mixing element are preferably fixed installations through which the mixture has to flow, whereby mixing is carried out as a result of the flowing through. The mixer/heat-exchanger can be constructed as a plug flow reactor.

Preferably the growth substrate product according to the invention comprises at least 90 wt % man-made vitreous fibres by weight of the total solid content of the growth substrate. An advantage of having such an amount of fibres present in the growth substrate product is that there are sufficient pores formed between the fibres to allow the growth substrate product to hold water and nutrients for the cutting, whilst maintaining the ability for roots of the plants to permeate the growth substrate product. The remaining solid content may be made up primarily of binder.

The growth substrate product is in the form of a coherent mass. That is, the growth substrate is generally a coherent matrix of man-made vitreous fibres, which has been produced as such, but can also be formed by granulating a slab of mineral wool and consolidating the granulated material. A coherent substrate is a single, unified substrate.

The growth substrate product according to the invention may optionally comprise a wetting agent.

A wetting agent has its normal meaning in the art, and may be a cationic, anionic or non-ionic surfactant.

The growth substrate product may comprise a non-ionic wetting agent such as Rewopal®.

The growth substrate product may comprise an ionic surfactant, more preferably an alkyl ether sulphate surfactant wetting agent. The wetting agent may be an alkali metal alkyl ether sulphate or an ammonium alkyl ether sulphate. Preferably the wetting agent is a sodium alkyl ether sulphate. Alkyl ether sulphate surfactant wetting agents are commercially available. The wetting agent may also be a linear alkyl benzene sulphonate anionic surfactant.

Some non-ionic wetting agents may be washed out of the MMVF substrate over time. It is therefore preferable to use an ionic wetting agent, especially an anionic wetting agent, such as linear alkyl benzene sulphonate.

Preferably the growth substrate product comprises 0.01 to 1 wt % wetting agent, preferably 0.05 to 0.5 wt % wetting agent, more preferably 0.1 to 0.3 wt % wetting agent.

However, the inventors discovered that a wetting agent is not essential for the growth substrate product according to the invention. This is believed to be due to the nature of the binder composition. Therefore, preferably the growth substrate does not comprise any wetting agent. By this, it is meant that the growth substrate preferably comprises no wetting agent i.e. comprises 0 wt % wetting agent.

This has several advantages. Firstly, it reduces the number of additives in the growth substrate product which is environmentally advantageous, and also saves costs. Often wetting agents are made from non-renewable sources so it is beneficial to avoid their use. Additionally, wetting agents may be washed out of the growth substrate product. This is problematic because the wetting agent may contaminate the water supply and must be properly disposed of in line with environmental regulations. When a wetting agent is washed out this also changes the nature of the growth substrate product, which can lead to inconsistencies in the growing process. Furthermore, wetting agents have the disadvantage that they can cause foam to be released from the product during use. Avoiding the use of a wetting agent avoids these problems.

The hydrophilicity of a sample of MMVF substrate can be measured by determining the sinking time of a sample. A sample of MMVF substrate having dimensions of 100×100×65 mm is required for determining the sinking time. A container with a minimum size of 200×200×200 mm is filled with water. The sinking time is the time from when the sample first contacts the water surface to the time when the test specimen is completely submerged. The sample is placed in contact with the water in such a way that a cross-section of 100×100 mm first touches the water. The sample will then need to sink a distance of just over 65 mm in order to be completely submerged. The faster the sample sinks, the more hydrophilic the sample is. The MMVF substrate is considered hydrophilic if the sinking time is less than 120 s. Preferably the sinking time is less than 60 s. In practice, the MMVF substrate may have a sinking time of a few seconds, such as less than 10 seconds.

The hydrophilicity of the growth substrate product may be defined in terms of the contact angle with water. Preferably, the MMVF of the growth substrate product has a contact angle with water of less than 90°. The contact angle is measured by a sessile drop measurement method. Any sessile drop method can be used, for example with a contact angle goniometer. In practice, a droplet is placed on the solid surface and an image of the drop is recorded in time. The static contact angle is then defined by fitting Young-Laplace equation around the droplet. The contact angle is given by the angle between the calculated drop shape function and the sample surface, the projection of which in the drop image is referred to as the baseline. The equilibrium contact angles are used for further evaluation and calculation of the surface free energy using the Owens, Wendt, Rabel and Kaeble method. The method for calculating the contact angle between material and water is well-known to the skilled person.

In the method according to the invention, the growth substrate product has a density in the range of 40 to 100 kg/m$^3$, preferably 45 to 80 kg/m$^3$. This density range was found to be optimal for root growth and product handling, allowing the roots to penetrate and ensuring that the product is not damaged during handling.

In the method of the invention, the growth substrate product preferably has a volume in the range 0.003 to 87 litres, such as 0.005 to 30 litres, preferably 0.008 to 20 litres. The growth substrate product may be in the form of a product conventionally known as a plug, or in the form of a product conventionally known as a block, or in the form of a product conventionally known as a slab.

Preferably, the growth substrate product has a height in the range of 10 mm to 200 mm.

The growth substrate product may have dimensions conventional for the product type commonly known as a plug. Thus it may have height from 20 to 35 mm, often 25 to 28 mm, and length and width in the range 15 to 25 mm, often around 20 mm.

In this case the substrate is often substantially cylindrical with the end surfaces of the cylinder forming the top and bottom surfaces of the growth substrate.

The volume of the growth substrate product in the form of a plug is preferably not more than 150 cm$^3$. In general the volume of the growth substrate product in the form of a plug is in the range 3 to 150 cm$^3$ and preferably not more than 100 cm$^3$, more preferably not more than 80 cm$^3$, in particular not more than 75 cm$^3$, most preferably not more than 70 cm$^3$. The minimum distance between the top and bottom surfaces of a plug is preferably less than 60 mm, more preferably less than 50 mm and in particular less than 40 mm or less.

Another embodiment of a plug has height from 30 to 50 mm, often around 40 mm and length and width in the range 20 to 40 mm, often around 30 mm. The growth substrate in this case is often of cuboid form. In this first case the volume of the growth substrate is often not more than 50 cm$^3$, preferably not more than 40 cm$^3$.

The growth substrate may be of the type of plug described as the first coherent MMVF growth substrate in our publication WO2010/003677, which is hereby incorporated by reference herein in its entirety. In this case the volume of the growth substrate product is most preferably in the range to 10 to 40 cm$^3$.

The growth substrate product may have dimensions conventional for the product type commonly known as a block. Thus it may have height from 5 to 20 cm, often 6 to 15 cm, and length and width in the range 4 to 30 cm, often 10 to 20 cm. In this case the substrate is often substantially cuboidal. The volume of the growth substrate product in the form of a block is preferably in the range 64 to 8000 cm$^3$.

The growth substrate product may have dimensions conventional for the product type commonly known as a slab. Thus it may have height from 5 to 15 cm, often 7.5 to 12.5 cm, a width in the range of 5 to 30 cm, often 12 to 24 cm, and a length in the range 30 to 240 cm, often 40 to 200 cm. In this case the substrate is often substantially cuboidal. The volume of the growth substrate product in the form of a slab is preferably in the range 750 to 86,400 cm$^3$.

The growth substrate product may have a volume in the range 3 to 300 cm$^3$. It may be a cube with dimensions of 4 cm by 4 cm by 4 cm. The growth substrate product may be also cylindrical. Preferably it has a length 50 mm and a diameter or 46 mm, or a length of 40 mm and a diameter of 36 mm, or a length of 27 mm and a diameter of 22 mm.

In general, the growth substrate product may be of any appropriate shape including cylindrical, cuboidal and cubic. Usually the top and bottom surfaces are substantially planar.

In the present invention, the term "height" means the distance from the bottom surface to the top surface when the substrate is in use. The top surface is the surface that faces upwardly when the product is positioned as intended to be used and the bottom surface is the surface that faces downwardly (and on which the product rests) when the product is positioned as intended to be used. The term "length" means the longest distance between two sides i.e. the distance from one end to the other end when the substrate is in use. The term "width" is the distance between two sides, perpendicular to the length. These terms have their normal meaning in the art.

The growth substrate product according to the invention may have a seed hole. Alternatively, it may not have a seed hole. The term seed hole has its normal meaning in the art, and can also be called a plant hole or cavity. A seed hole is an indentation in the top surface of a growth substrate, into which a seed, seedling, cutting or plant is placed.

Preferably, the growth substrate product comprises a liquid impermeable covering surrounding at least the side surfaces of the substrate. Preferably the liquid impermeable covering is plastic. The growth substrate product may comprise a liquid impermeable covering encasing the entire substrate, wherein the covering has at least one opening for a drain hole and at least one opening on the upper surface to allow contact between the growth substrate and a further growth substrate.

The terms seed, seedling, cutting and plant have their normal meaning in the art. The seeds, seedlings, cuttings and plants may be that of cucumbers, tomatoes, eggplant, sweet peppers, strawberries, lettuce, perennial plants such as roses; gerberas or medicinal cannabis.

In the method of the present invention, the growth substrate product is irrigated. Preferably it is irrigated with water and nutrients. This can be done using any of the methods known to the skilled person.

In the present invention, the seed, seedling, cutting or plant is placed in contact with the growth substrate product. This means that the seed, seedling, cutting or plant may be placed directly into the substrate, for example into a seed hole. Alternatively it can be positioned such that it grows into the substrate, for example from a further growth substrate. Any part of the seed, seedling, cutting or plant may be in contact with any part of the growth substrate product.

The present invention also relates to a coherent growth substrate product comprising man-made vitreous fibres (MMVF) bonded with a cured binder composition, wherein the binder composition prior to curing comprises
- a component (i) in the form of one or more oxidized lignins;
- a component (ii) in the form of one or more cross-linkers; and
- a component (iii) in the form of one or more plasticizers.

The coherent growth substrate product is as described above. This embodiment may have any of the preferred features described above for the method of the invention, as follows.

Component (i) can be in the form of one or more ammonia-oxidized lignins (AOLs).

Component (ii) can comprise one or more cross-linkers selected from β-hydroxyalkylamide-cross-linkers and/or oxazoline-cross-linkers.

Component (ii) can comprise:
- one or more cross-linkers selected from the group consisting of polyethylene imine, polyvinyl amine, fatty amines; and/or
- one more cross-linkers in form of fatty amides; and/or
- one or more cross-linkers selected from the group consisting of dimethoxyethanal, glycolaldehyde, glyoxalic acid; and/or
- one or more cross-linkers selected from polyester polyols, such as polycaprolactone; and/or
- one or more cross-linkers selected from the group consisting of starch, modified starch, CMC; and/or
- one or more cross-linkers in form of aliphatic multifunctional carbodiimides; and/or
- one or more cross-linkers selected from melamine based cross-linkers, such as a hexakis(methylmethoxy)melamine (HMMM) based cross-linkers.

Component (ii) can be present in an amount of 1 to 40 wt.-%, such as 4 to 20 wt.-%, such as 6 to 12 wt.-%, based on the dry weight of component (i).

Component (iii) can comprise one or more plasticizers selected from the group consisting of polyethylene glycols, polyethylene glycol ethers, polyethers, hydrogenated sugars, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups.

Component (iii) can comprise:
- one or more plasticizers selected from the group consisting of fatty alcohols, monohydroxy alcohols, such as pentanol, stearyl alcohol; and/or
- one or more plasticizers selected from the group consisting of alkoxylates such as ethoxylates, such as butanol ethoxylates, such as butoxytriglycol; and/or
- one or more plasticizers in form of propylene glycols; and/or
- one or more plasticizers in form of glycol esters; and/or
- one or more plasticizers selected from the group consisting of adipates, acetates, benzoates, cyclobenzoates, citrates, stearates, sorbates, sebacates, azelates, butyrates, valerates; and/or
- one or more plasticizers selected from the group consisting of phenol derivatives, such as alkyl or aryl substituted phenols; and/or
- one or more plasticizers selected from the group consisting of silanols, siloxanes; and/or
- one or more plasticizers selected from the group consisting of sulfates such as alkyl sulfates, sulfonates such as alkyl aryl sulfonates such as alkyl and/or sulfonates, phosphates such as tripolyphosphates; and/or
- one or more plasticizers in form of hydroxy acids; and/or
- one or more plasticizers selected from the group consisting of monomeric amides, such as acetamides, benzamide, fatty acid amides such as tall oil amides; and/or
- one or more plasticizers selected from the group consisting of quaternary ammonium compounds such as trimethylglycine, distearyldimethylammoniumchloride; and/or
- one or more plasticizers selected from the group consisting of vegetable oils such as castor oil, palm oil, linseed oil, tall oil, soybean oil; and/or
- one or more plasticizers selected from the group consisting of hydrogenated oils, acetylated oils; and/or
- one or more plasticizers selected from acid methyl esters; and/or
- one or more plasticizers selected from the group consisting of alkyl polyglucosides, gluconamides, aminoglucoseamides, sucrose esters, sorbitan esters; and/or
- one or more plasticizers selected from the group consisting of polyethylene glycols, polyethylene glycol ethers.

Component (iii) can be present in an amount of 0.5 to 50, preferably 2.5 to 25, more preferably 3 to 15 wt.-%, based on the dry weight of component (i).

The aqueous binder composition can comprise a further component (iv) in the form of one or more coupling agents, such as organofunctional silanes.

The aqueous binder composition can comprise a component (v) in the form of one or more components selected from the group of ammonia, amines or any salts thereof.

The aqueous binder composition can comprise a further component in the form of urea, in particular in an amount 5 to 40 wt.-%, such as 10 to 30 wt.-%, such as 15 to 25 wt.-%, based on the dry weight of component (i).

The binder composition can consist essentially of:
- a component (i) in the form of one or more oxidized lignins;
- a component (ii) in the form of one or more cross-linkers;
- a component (iii) in the form of one or more plasticizers;
- a component (iv) in the form of one or more coupling agents, such as organofunctional silanes;
- optionally a component in the form of one or more compounds selected from the group of ammonia, amines or any salts thereof;
- optionally a component in the form of urea;
- optionally a component in the form of a more reactive or non-reactive silicones;
- optionally a hydrocarbon oil;
- optionally one or more surface active agents;
- water.

The coherent growth substrate product can comprise MMVF with a contact angle with water of less than 90°.

The coherent growth substrate product can comprise MMVF with a geometric mean fibre diameter in the range of 1.5 to 10 microns, preferably 2 to 8 microns, most preferably 2 to 5 microns.

The growth substrate product can have a volume in the range of 0.003 litres to 87 litres.

The coherent growth substrate product can comprise a liquid-impermeable covering.

The coherent growth substrate product can have a height of 10 mm to 150 mm.

The coherent growth substrate product may not comprise any wetting agent.

The present invention also relates to an array of two or more coherent growth substrate products, wherein the coherent growth substrate products comprise man-made vitreous fibres (MMVF) bonded with a cured binder composition, wherein the binder composition prior to curing comprises
- a component (i) in the form of one or more oxidized lignins;
- a component (ii) in the form of one or more cross-linkers; and
- a component (iii) in the form of one or more plasticizers.

In this embodiment, one or more of the coherent growth substrate products may have any of the preferred features described above for the method of the invention, as follows.

Component (i) can be in the form of one or more ammonia-oxidized lignins (AOLs).

Component (ii) can comprise one or more cross-linkers selected from β-hydroxyalkylamide-cross-linkers and/or oxazoline-cross-linkers.

Component (ii) can comprise:
- one or more cross-linkers selected from the group consisting of polyethylene imine, polyvinyl amine, fatty amines; and/or
- one more cross-linkers in form of fatty amides; and/or
- one or more cross-linkers selected from the group consisting of dimethoxyethanal, glycolaldehyde, glyoxalic acid; and/or
- one or more cross-linkers selected from polyester polyols, such as polycaprolactone; and/or
- one or more cross-linkers selected from the group consisting of starch, modified starch, CMC; and/or
- one or more cross-linkers in form of aliphatic multifunctional carbodiimides; and/or
- one or more cross-linkers selected from melamine based cross-linkers, such as a hexakis(methylmethoxy)melamine (HMMM) based cross-linkers.

Component (ii) can be present in an amount of 1 to 40 wt.-%, such as 4 to 20 wt.-%, such as 6 to 12 wt.-%, based on the dry weight of component (i).

Component (iii) can comprise one or more plasticizers selected from the group consisting of polyethylene glycols, polyethylene glycol ethers, polyethers, hydrogenated sugars, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups.

Component (iii) can comprise:
- one or more plasticizers selected from the group consisting of fatty alcohols, monohydroxy alcohols, such as pentanol, stearyl alcohol; and/or
- one or more plasticizers selected from the group consisting of alkoxylates such as ethoxylates, such as butanol ethoxylates, such as butoxytriglycol; and/or
- one or more plasticizers in form of propylene glycols; and/or
- one or more plasticizers in form of glycol esters; and/or
- one or more plasticizers selected from the group consisting of adipates, acetates, benzoates, cyclobenzoates, citrates, stearates, sorbates, sebacates, azelates, butyrates, valerates; and/or
- one or more plasticizers selected from the group consisting of phenol derivatives, such as alkyl or aryl substituted phenols; and/or
- one or more plasticizers selected from the group consisting of silanols, siloxanes; and/or
- one or more plasticizers selected from the group consisting of sulfates such as alkyl sulfates, sulfonates such as alkyl aryl sulfonates such as alkyl and/or
- sulfonates, phosphates such as tripolyphosphates; and/or
- one or more plasticizers in form of hydroxy acids; and/or
- one or more plasticizers selected from the group consisting of monomeric amides, such as acetamides, benzamide, fatty acid amides such as tall oil amides; and/or
- one or more plasticizers selected from the group consisting of quaternary ammonium compounds such as trimethylglycine, distearyldimethylammoniumchloride; and/or
- one or more plasticizers selected from the group consisting of vegetable oils such as castor oil, palm oil, linseed oil, tall oil, soybean oil; and/or
- one or more plasticizers selected from the group consisting of hydrogenated oils, acetylated oils; and/or
- one or more plasticizers selected from acid methyl esters; and/or
- one or more plasticizers selected from the group consisting of alkyl polyglucosides, gluconamides, aminoglucoseamides, sucrose esters, sorbitan esters; and/or
- one or more plasticizers selected from the group consisting of polyethylene glycols, polyethylene glycol ethers.

Component (iii) can be present in an amount of 0.5 to 50, preferably 2.5 to 25, more preferably 3 to 15 wt.-%, based on the dry weight of component (i).

The aqueous binder composition can comprise a further component (iv) in the form of one or more coupling agents, such as organofunctional silanes.

The aqueous binder composition can comprise a component (v) in the form of one or more components selected from the group of ammonia, amines or any salts thereof.

The aqueous binder composition can comprise a further component in the form of urea, in particular in an amount 5 to 40 wt.-%, such as 10 to 30 wt.-%, such as 15 to 25 wt.-%, based on the dry weight of component (i).

The binder composition can consist essentially of:
- a component (i) in the form of one or more oxidized lignins;
- a component (ii) in the form of one or more cross-linkers;
- a component (iii) in the form of one or more plasticizers;
- a component (iv) in the form of one or more coupling agents, such as organofunctional silanes;
- optionally a component in the form of one or more compounds selected from the group of ammonia, amines or any salts thereof;
- optionally a component in the form of urea;
- optionally a component in the form of a more reactive or non-reactive silicones;
- optionally a hydrocarbon oil;
- optionally one or more surface active agents;
- water.

The coherent growth substrate product can comprise MMVF with a contact angle with water of less than 90°.

The coherent growth substrate product can comprise MMVF with a geometric mean fibre diameter in the range of 1.5 to 10 microns, preferably 2 to 8 microns, most preferably 2 to 5 microns.

The growth substrate product can have a volume in the range of 0.003 litres to 87 litres.

The coherent growth substrate product can comprise a liquid-impermeable covering.

The coherent growth substrate product can have a height of 10 mm to 150 mm.

The coherent growth substrate product may not comprise any wetting agent.

In the array according to the invention, the at least two coherent growth substrate product may be identical. For example, it may be two identical coherent growth substrate products positioned beside each other. Alternatively, the at least two growth substrate products may not be identical.

Preferably, the array comprises one growth substrate product positioned in contact with the second growth substrate product. Preferably, one growth substrate is positioned on the top surface of the second growth substrate, for example in a plug/block, block/slab, block/block, plug/block/slab or plug/block/block arrangement. In a plug/block arrangement, a substrate described as a plug above is positioned in contact with a substrate described as a block above. For example, the plug may be inserted into a cavity in the block. In a block/slab arrangement, a substrate described as a block above is positioned in contact with a substrate described as a slab above. For example, the block is positioned on the top surface of the slab. In a block, block arrangement a block is positioned in contact with another block, for example, it may be positioned on the top surface of the other block. In a plug, block, slab arrangement, a plug is positioned in contact with a block, which in turn is positioned in contact with a slab. This is analogous for a plug/block/block arrangement: a plug is positioned in contact with another block, which in turn is positioned in contact with a block.

The present invention is also directed to use of a coherent growth substrate product for growing plants, wherein the coherent growth substrate product comprises man-made vitreous fibres (MMVF) bonded with a cured aqueous binder composition, wherein the aqueous binder composition prior to curing comprises
 a component (i) in the form of one or more oxidized lignins;
 a component (ii) in the form of one or more cross-linkers; and
 a component (iii) in the form of one or more plasticizers.

This embodiment of the invention may have any of the additional features described above for the method of the invention, as follows.

Component (i) can be in the form of one or more ammonia-oxidized lignins (AOLs).

Component (ii) can comprise one or more cross-linkers selected from 3-hydroxyalkylamide-cross-linkers and/or oxazoline-cross-linkers.

Component (ii) can comprise:
 one or more cross-linkers selected from the group consisting of polyethylene imine, polyvinyl amine, fatty amines; and/or
 one more cross-linkers in form of fatty amides; and/or
 one or more cross-linkers selected from the group consisting of dimethoxyethanal, glycolaldehyde, glyoxalic acid; and/or
 one or more cross-linkers selected from polyester polyols, such as polycaprolactone; and/or
 one or more cross-linkers selected from the group consisting of starch, modified starch, CMC; and/or
 one or more cross-linkers in form of aliphatic multifunctional carbodiimides; and/or
 one or more cross-linkers selected from melamine based cross-linkers, such as a hexakis(methylmethoxy)melamine (HMMM) based cross-linkers.

Component (ii) can be present in an amount of 1 to 40 wt.-%, such as 4 to 20 wt.-%, such as 6 to 12 wt.-%, based on the dry weight of component (i).

Component (iii) can comprise one or more plasticizers selected from the group consisting of polyethylene glycols, polyethylene glycol ethers, polyethers, hydrogenated sugars, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups.

Component (iii) can comprise:
 one or more plasticizers selected from the group consisting of fatty alcohols, monohydroxy alcohols, such as pentanol, stearyl alcohol; and/or
 one or more plasticizers selected from the group consisting of alkoxylates such as ethoxylates, such as butanol ethoxylates, such as butoxytriglycol; and/or
 one or more plasticizers in form of propylene glycols; and/or
 one or more plasticizers in form of glycol esters; and/or
 one or more plasticizers selected from the group consisting of adipates, acetates, benzoates, cyclobenzoates, citrates, stearates, sorbates, sebacates, azelates, butyrates, valerates; and/or
 one or more plasticizers selected from the group consisting of phenol derivatives, such as alkyl or aryl substituted phenols; and/or
 one or more plasticizers selected from the group consisting of silanols, siloxanes; and/or
 one or more plasticizers selected from the group consisting of sulfates such as alkyl sulfates, sulfonates such as alkyl aryl sulfonates such as alkyl and/or
sulfonates, phosphates such as tripolyphosphates; and/or
 one or more plasticizers in form of hydroxy acids; and/or
 one or more plasticizers selected from the group consisting of monomeric amides, such as acetamides, benzamide, fatty acid amides such as tall oil amides; and/or
 one or more plasticizers selected from the group consisting of quaternary ammonium compounds such as trimethylglycine, distearyldimethylammoniumchloride; and/or
 one or more plasticizers selected from the group consisting of vegetable oils such as castor oil, palm oil, linseed oil, tall oil, soybean oil; and/or
 one or more plasticizers selected from the group consisting of hydrogenated oils, acetylated oils; and/or
 one or more plasticizers selected from acid methyl esters; and/or
 one or more plasticizers selected from the group consisting of alkyl polyglucosides, gluconamides, aminoglucoseamides, sucrose esters, sorbitan esters; and/or
 one or more plasticizers selected from the group consisting of polyethylene glycols, polyethylene glycol ethers.

Component (iii) can be present in an amount of 0.5 to 50, preferably 2.5 to 25, more preferably 3 to 15 wt.-%, based on the dry weight of component (i).

The aqueous binder composition can comprise a further component (iv) in the form of one or more coupling agents, such as organofunctional silanes.

The aqueous binder composition can comprise a component (v) in the form of one or more components selected from the group of ammonia, amines or any salts thereof.

The aqueous binder composition can comprise a further component in the form of urea, in particular in an amount 5 to 40 wt.-%, such as 10 to 30 wt.-%, such as 15 to 25 wt.-%, based on the dry weight of component (i).

The binder composition can consist essentially of:
a component (i) in the form of one or more oxidized lignins;
a component (ii) in the form of one or more cross-linkers;
a component (iii) in the form of one or more plasticizers;
a component (iv) in the form of one or more coupling agents, such as organofunctional silanes;
optionally a component in the form of one or more compounds selected from the group of ammonia, amines or any salts thereof;
optionally a component in the form of urea;
optionally a component in the form of a more reactive or non-reactive silicones;
optionally a hydrocarbon oil;
optionally one or more surface active agents;
water.

The coherent growth substrate product can comprise MMVF with a contact angle with water of less than 90°.

The coherent growth substrate product can comprise MMVF with a geometric mean fibre diameter in the range of 1.5 to 10 microns, preferably 2 to 8 microns, most preferably 2 to 5 microns.

The growth substrate product can have a volume in the range of 0.003 litres to 87 litres.

The coherent growth substrate product can comprise a liquid-impermeable covering.

The coherent growth substrate product can have a height of 10 mm to 150 mm.

The coherent growth substrate product may not comprise any wetting agent.

The present invention also relates to a method of making a growth substrate product comprising the steps of:
(i) providing MMVF;
(ii) spraying the MMVF with an aqueous binder composition;
(iii) collecting and consolidating the MMVF; and
(iv) curing the aqueous binder composition;
wherein the aqueous binder composition prior to curing comprises:
a component (i) in the form of one or more oxidized lignins;
a component (ii) in the form of one or more cross-linkers; and
a component (iii) in the form of one or more plasticizers.

This embodiment of the invention may have any of the additional features described above for the method of the invention or growth substrate of the invention, as follows.

Component (i) can be in the form of one or more ammonia-oxidized lignins (AOLs).

Component (ii) can comprise one or more cross-linkers selected from β-hydroxyalkylamide-cross-linkers and/or oxazoline-cross-linkers.

Component (ii) can comprise:
one or more cross-linkers selected from the group consisting of polyethylene imine, polyvinyl amine, fatty amines; and/or
one more cross-linkers in form of fatty amides; and/or
one or more cross-linkers selected from the group consisting of dimethoxyethanal, glycolaldehyde, glyoxalic acid; and/or
one or more cross-linkers selected from polyester polyols, such as polycaprolactone; and/or
one or more cross-linkers selected from the group consisting of starch, modified starch, CMC; and/or
one or more cross-linkers in form of aliphatic multifunctional carbodiimides; and/or
one or more cross-linkers selected from melamine based cross-linkers, such as a hexakis(methylmethoxy)melamine (HMMM) based cross-linkers.

Component (ii) can be present in an amount of 1 to 40 wt.-%, such as 4 to 20 wt.-%, such as 6 to 12 wt.-%, based on the dry weight of component (i).

Component (iii) can comprise one or more plasticizers selected from the group consisting of polyethylene glycols, polyethylene glycol ethers, polyethers, hydrogenated sugars, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups.

Component (iii) can comprise:
one or more plasticizers selected from the group consisting of fatty alcohols, monohydroxy alcohols, such as pentanol, stearyl alcohol; and/or
one or more plasticizers selected from the group consisting of alkoxylates such as ethoxylates, such as butanol ethoxylates, such as butoxytriglycol; and/or
one or more plasticizers in form of propylene glycols; and/or
one or more plasticizers in form of glycol esters; and/or
one or more plasticizers selected from the group consisting of adipates, acetates, benzoates, cyclobenzoates, citrates, stearates, sorbates, sebacates, azelates, butyrates, valerates; and/or
one or more plasticizers selected from the group consisting of phenol derivatives, such as alkyl or aryl substituted phenols; and/or
one or more plasticizers selected from the group consisting of silanols, siloxanes; and/or
one or more plasticizers selected from the group consisting of sulfates such as alkyl sulfates, sulfonates such as alkyl aryl sulfonates such as alkyl and/or
sulfonates, phosphates such as tripolyphosphates; and/or
one or more plasticizers in form of hydroxy acids; and/or
one or more plasticizers selected from the group consisting of monomeric amides, such as acetamides, benzamide, fatty acid amides such as tall oil amides; and/or
one or more plasticizers selected from the group consisting of quaternary ammonium compounds such as trimethylglycine, distearyldimethylammoniumchloride; and/or
one or more plasticizers selected from the group consisting of vegetable oils such as castor oil, palm oil, linseed oil, tall oil, soybean oil; and/or
one or more plasticizers selected from the group consisting of hydrogenated oils, acetylated oils; and/or
one or more plasticizers selected from acid methyl esters; and/or
one or more plasticizers selected from the group consisting of alkyl polyglucosides, gluconamides, aminoglucoseamides, sucrose esters, sorbitan esters; and/or
one or more plasticizers selected from the group consisting of polyethylene glycols, polyethylene glycol ethers.

Component (iii) can be present in an amount of 0.5 to 50, preferably 2.5 to 25, more preferably 3 to 15 wt.-%, based on the dry weight of component (i).

The aqueous binder composition can comprise a further component (iv) in the form of one or more coupling agents, such as organofunctional silanes.

The aqueous binder composition can comprise a component (v) in the form of one or more components selected from the group of ammonia, amines or any salts thereof.

The aqueous binder composition can comprise a further component in the form of urea, in particular in an amount 5 to 40 wt.-%, such as 10 to 30 wt.-%, such as 15 to 25 wt.-%, based on the dry weight of component (i).

The binder composition can consist essentially of:
- a component (i) in the form of one or more oxidized lignins;
- a component (ii) in the form of one or more cross-linkers;
- a component (iii) in the form of one or more plasticizers;
- a component (iv) in the form of one or more coupling agents, such as organofunctional silanes;
- optionally a component in the form of one or more compounds selected from the group of ammonia, amines or any salts thereof;
- optionally a component in the form of urea;
- optionally a component in the form of a more reactive or non-reactive silicones;
- optionally a hydrocarbon oil;
- optionally one or more surface active agents;
- water.

The coherent growth substrate product can comprise MMVF with a contact angle with water of less than 90°.

The coherent growth substrate product can comprise MMVF with a geometric mean fibre diameter in the range of 1.5 to 10 microns, preferably 2 to 8 microns, most preferably 2 to 5 microns.

The growth substrate product can have a volume in the range of 0.003 litres to 87 litres.

The coherent growth substrate product can comprise a liquid-impermeable covering.

The coherent growth substrate product can have a height of 10 mm to 150 mm.

The coherent growth substrate product may not comprise any wetting agent.

Man-made vitreous fibres can be made from a mineral melt. A mineral melt is provided in a conventional manner by providing mineral materials and melting them in a furnace. This furnace can be any of the types of furnace known for production of mineral melts for MMVF, for instance a shaft furnace such as a cupola furnace, a tank furnace, or a cyclone furnace.

Any suitable method may be employed to form MMVF from the mineral melt by fiberization. The fiberization can be by a spinning cup process in which melt is centrifugally extruded through orifices in the walls of a rotating cup (spinning cup, also known as internal centrifugation). Alternatively the fiberization can be by centrifugal fiberization by projecting the melt onto and spinning off the outer surface of one fiberizing rotor, or off a cascade of a plurality of fiberizing rotors, which rotate about a substantially horizontal axis (cascade spinner).

The melt is thus formed into a cloud of fibres entrained in air and the fibres are collected as a web on a conveyor and carried away from the fiberizing apparatus.

The web of fibres is then consolidated, which can involve cross-lapping and/or longitudinal compression and/or vertical compression and/or winding around a mandrel to produce a cylindrical product for pipe insulation. Other consolidation processes may also be performed.

The binder composition is applied to the fibres preferably when they are a cloud entrained in air. Alternatively it can be applied after collection on the conveyor but this is less preferred.

After consolidation the consolidated web of fibres is passed into a curing device to cure the binder.

In one embodiment, the curing is carried out at temperatures from 100 to 300° C., such as 170 to 270° C., such as 180 to 250° C., such as 190 to 230° C.

In a preferred embodiment, the curing takes place in a conventional curing oven for mineral wool production, preferably operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

In a typical embodiment, curing takes place at a temperature of 150 to 250° C. for a time of 30 seconds to 20 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state. The cured binder composition binds the fibres to form a structurally coherent matrix of fibres.

In a one embodiment, the curing of the binder in contact with the mineral fibres takes place in a heat press.

The curing of a binder in contact with the mineral fibres in a heat press has the particular advantage that it enables the production of high-density products.

In one embodiment the curing process comprises drying by pressure. The pressure may be applied by blowing air or gas through/over the mixture of mineral fibres and binder.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

EXAMPLES

Example 1—Phytotoxicity

The phytotoxicity of a binder according to the invention was compared to a phenol-urea-formaldehyde (PUF) binder. Each binder was diluted in a nutrient solution to various concentrations. These solutions were then used to grow cucumber plants. The results are shown below in Table 1.

In this test, the length of the first two leaves of the cucumber seedlings were measured. The length of this leaf pair is called the cotyledon leaf length. A reference without addition of binder was measured and set on 100%. If the added binder reduces the plant growth, the length of the leaf pair will be less, and the reduction in length is then calculated (see column growth inhibition).

The binder of the invention was made as follows:

AOL (ammonia oxidised lignin): 1000 kg (284 kg lignin UPM BioPiva 100, 57 kg $H_2O_2$ (35%), 53 kg $NH_4OH$ (24.7%), 506 kg water)

Plasticizer (PEG200): 44 kg

Crosslinker (Primid XL552—β-hydroxyalkyl-amide (HAA) crosslinker supplied by EMS-Chemie AG): 22 kg The PUF binder was made as follows:

phenol urea formaldehyde resin: 329 litres water: 1337 litres ammonia water: 13 litres ammonium sulphate: 30.5 litres aminosilane VS-142 from Momentive: 1.6 litres Primid XL552 has the following structure:

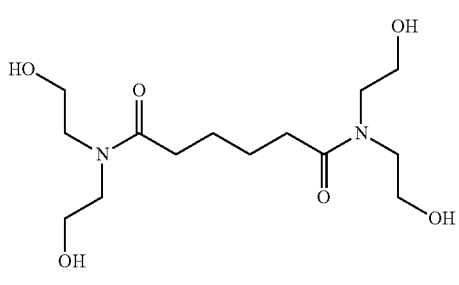

Primid XL-552

TABLE 1

| Product | Concentration % | Relative Cotyledon Leaf Length % | Growth inhibition <=20% | pH |
|---|---|---|---|---|
| 1: PUF | 0.04 | 102.8 | −2.8% | 8.66 |
|  | 0.4 | 95.6 | 4.4% | 8.41 |
|  | 4 | — | 100.0% | 6.51 |
|  | 6 | — | 100.0% | 5.73 |
| 2: Binder of the Invention | 0.04 | 104.8 | −4.8% | 8.77 |
|  | 0.4 | 97.0 | 3.0% | 8.59 |
|  | 4 | 68.3 | 31.7% | 6.67 |
|  | 6 | 55.3 | 44.7% | 5.79 |
| Blanco | 0.00 | — | — | 5.50 |

From the results, it can be seen that the pH for all used dilutions are similar for both tested binder types, so there was no pH effect. Therefore, the results can be directly compared.

Regarding phytotoxicity, growth on all tested dilutions of the invention were better than for the PUF binder.

The higher the values, the more growth inhibition. For example at 4% PUF added the growth inhibition is 100%, so the plant did not germinate. At 4% of the new binder the growth inhibition is 31.7%, which means that the length of the leaf pair is 68.3% of the reference plant leave length; so a major improvement compared to PUF.

Phytotoxicity at higher concentrations is lower for the binder of the invention. At both 6% and 4% dilution, growth was observed. However, the PUF binder shows no growth at all for these dilutions.

For lower concentrations, the binder of the invention performs slightly better compared to the PUF binder.

Example 2—Compression Strength

Six different substrates were prepared and analysed for compression strength.

Product 1: MMVF growth substrate comprising 2.1 wt % formaldehyde-free binder according to the present invention; density of 76 kg/m³; 3.5 litres/ton (0.15 wt %) of wetting agent (Texapon®). The binder in this product was made as described above for Example 1.

Product 2: MMVF growth substrate comprising 2.1 wt % formaldehyde-free binder according to the present invention; density of 76 kg/m³; no wetting agent. The binder in this product is the same as described above for Product 1.

Comparative Product 1: MMVF growth substrate comprising 2.6 wt % PUF binder; density of 77 kg/m³; 5.7 litres/ton of wetting agent (linear alkyl sulphonate). The binder in this product was made as described above in Example 1.

Comparative Product 2: MMVF growth substrate comprising 2.6 wt % PUF binder; density of 77 kg/m³; 3.5 litres/ton of wetting agent (Texapon®). The binder in this product is the same as described above for Comparative Product 1.

Comparative Product 3: MMVF growth substrate comprising 2.8 wt % formaldehyde-free binder; density of 78 kg/m³; 6.7 litres/ton of wetting agent (linear alkyl sulphonate). The binder in this product was made by reacting the following together:

185 kg AAA resin: 239 kg Dextrose: 575 kg Water: 1.1 kg Silane.

The AAA resin was made as follows:

90 kg of diethanolamine (DEA) is charged in a 400 l reactor and heated to 60° C. Then, 75 kg of tetrahydrophthalic anhydride (THPA) is added. After raising the temperature and keeping it at 130° C. for 1 hour, 50 kg of trimellitic anhydride (TMA) is added. The reaction mixture is cooled to 95° C., water is added and the mixture is stirred for 1 hour.

Comparative Product 4: MMVF growth substrate comprising 2.8 wt % formaldehyde-free binder; density of 78 kg/m3; 3.5 litres/ton of wetting agent (Texapon®). The binder in this product is the same as described above for Comparative Product 3.

The results are shown in FIGS. 1A to 1E. Compression was measured for both wet and dry according to standard EN826 from 1996 for insulation materials with the following deviations:

In the EN 826 the initial deformation $X_0$ and the critical compressive strength $\sigma_c$ and $\sigma_e$ are not calculated.

The EN standards for insulation materials require that the test specimens have to be stored and measured at (23±5)° C. In case of dispute, storage and measurement shall be carried out at (23±2)° C. and (50±5)% R.H., as it is considered not having any influence on mineral wool.

The binder amount used in Products 1 and 2 of the invention is significantly lower than the amounts used in Comparative Products 1 to 4. However, despite this, comparable compression results are seen when compared with the PUF binder and another formaldehyde-free binder. Therefore, using lower amounts of the binder of the invention, equivalent compression strength is achieved. It would be expected that increasing the binder amount of the invention to 2.8 wt % would result in improved compression strength. However, having comparable compression results at lower amounts provides the added advantage of reducing the total amount of binder in the product.

Example 3—Water Retention

Six products as defined above under Example 2 were tested for water retention: Product 1, Product 2, Comparative Product 1, Comparative Product 2, Comparative Product 3, and Comparative Product 4.

Water retention was measured according to the following test method.

Definitions

Water Content, WC: The content of water (in vol-%)

(Initial) Saturation, $WC_{-1/2h}$: The content of water (in vol-%), after a fully saturated specimen has leaked for 2 hrs on an underpressure identical to "half-thickness-water column".

$WC_{-10}$: The content of water (in vol-%), after a fully saturated specimen has stabilized on an underpressure identical to a 10 cm water column.

Re-saturation: The content of water (in vol-%), after a 50 vol-% specimen has been re-saturated for 24 hrs in 0.5 cm water.

Water column: the height of a water column, starting at the half of the thickness of the test specimen or block.

Apparatus:
Sandbox for pF-determination (range of pF 0-2.0 (0-100 cm), accuracy: zero setting 2 mm/flatness 6 mm/scale 1 mm) Used sand-type is typically sandblast quality (FEPA grade F100)
Digital altimeter (height) (accuracy 0.1 mm, range 0-200 mm)
Balance (accuracy A: 0.5 till 600 g±0.01 g, B: 600 till 3000 g±0.01 g)
Band saw
Bucket 25 liter or larger
Plastic container
Drainage grid
Wet stone wool column 1000 mm height and 200 mm width Method:
Determine the weight ($m_{wet}$) and height ($h_{wet}$) immediately after submersion.

Place the specimens in the user direction on the sandbox at an under pressure of 0 (level controller of 100). The water level in the water column should be on the same height as the surface of the sand. Determine the weight of the samples after 2 hours.

Place the specimens back on the sandbox in the user direction and apply an underpressure identical to a 10 cm water column for 24±2 hrs. Applying the underpressure has to be done in 3 (approx. identical) steps, each step will be followed by a stabilization time of 5 minutes. The height of the level controllers is dependent on the height of the sample.

Figure 2:
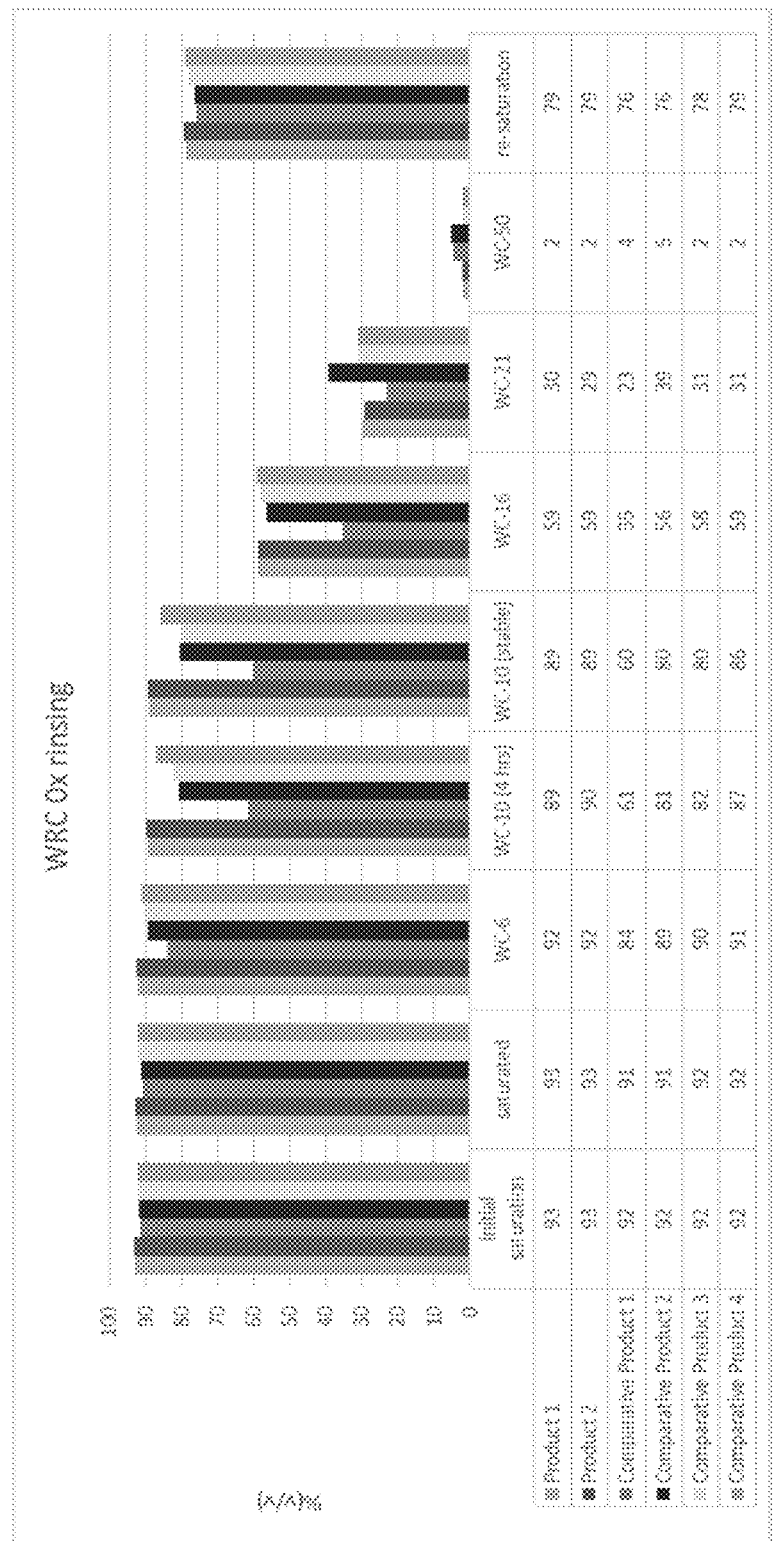
FIG. 2 shows the results of water retention tests.

The results are shown in FIG. 2.

The results for Product 1 and Product 2 are comparable, therefore, the addition of a wetting agent does not appear to have a significant effect on water retention.

Up to WC-10, both Product 1 and Product 2, according to the invention, are significantly more wet compared to PUF containing products (Comparative Products 1 and 2).

The water characteristics of Products 1 and 2 are comparable with other formaldehyde-free binder in Comparative Products 3 and 4.

Resaturation for all tested products is almost equal.

Therefore, the products of the invention show improved water retention in comparison with PUF binder, and comparable water retention in comparison to another formaldehyde-free binder.

Example 4—Water Distribution Over Height

Figure 3:
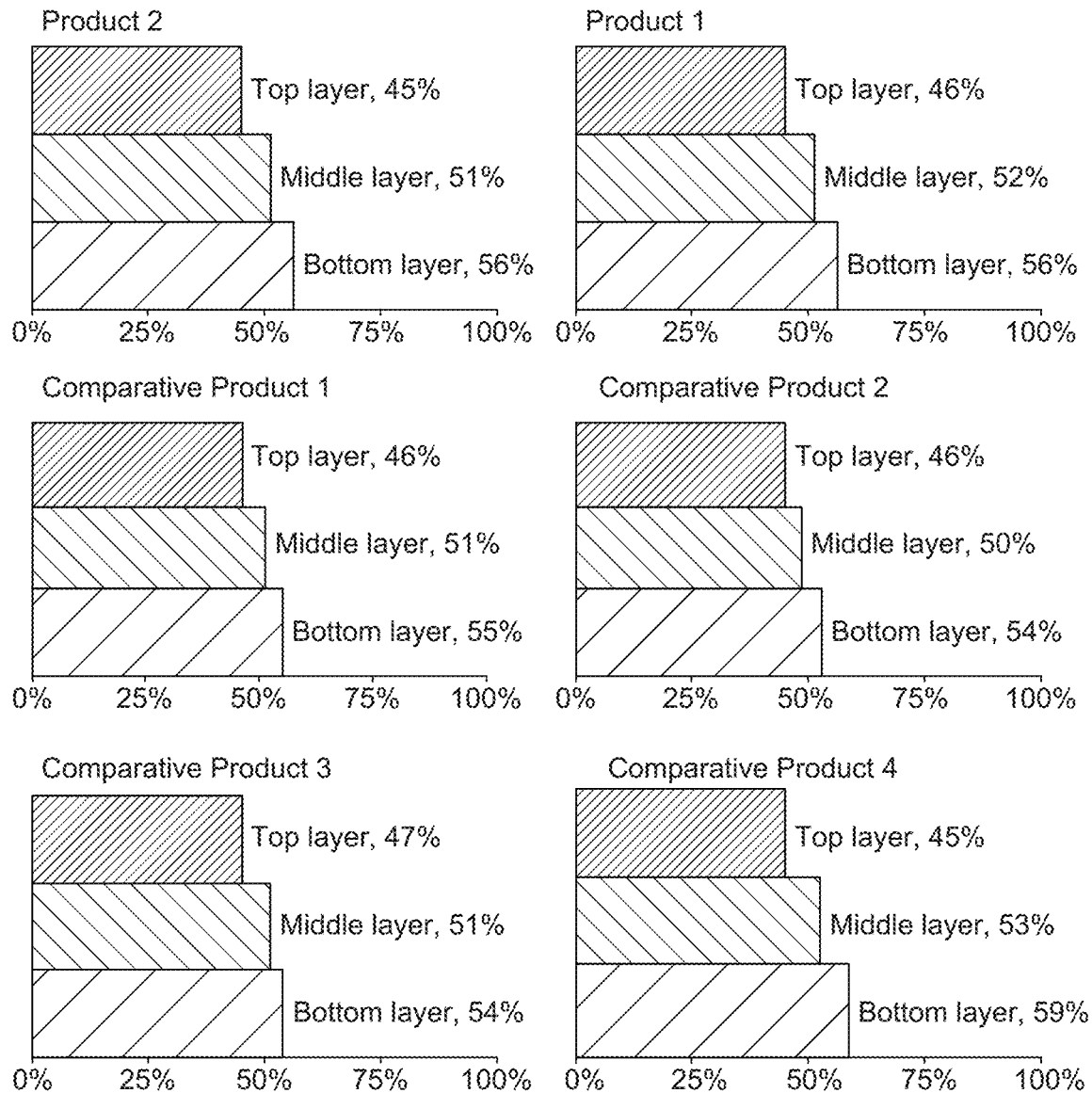
FIG. 3 shows the results of water distribution over height tests.

Six products as defined above under Example 1 were tested for water distribution over height. The results are shown in FIG. 3. Water distribution was measured in accordance with the following method.

Submerge the samples in a container containing tap water (20° C.±1° C.). Then bring the samples to a water content of 50% (v/V) using a stone wool column and a balance. The weight of a 50% (v/v) is calculated based on the volume of the sample and using the weight and height of the wet sample.

Measure the water content using a water content sensor and handreader at steps of 1.5 cm over the height of the sample.

As can be seen from the figures, the water distribution over height for the products of the invention were equivalent to those products with PUF binder or another formaldehyde-free binder.

Example 5

A binder as used in the growth substrate of the invention was prepared as follows: 3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This is done by checking the solution on a glass plate or a Hegman gauge. Insolubilized lignin is seen as small particles in the brown binder. During the dissolution step the lignin solution will change color from brown to shiny black.

After the lignin is completely dissolved, 1 liter of a foam dampening agent (Skumdæmper 11-10 from NCÅ-Verodan) is added. The temperature of the batch is maintained at 40° C.

Then addition of 307.5 kg 35% hydrogen peroxide is started. The hydrogen peroxide is dosed at a rate of 200-300 liter/hour. First half of the hydrogen peroxide is added at a rate of 200 l/h where after the dosage rate is increased to 300 liter/hour.

During the addition of hydrogen peroxide is the temperature in the reaction mixture controlled by heating or cooling in such a way that a final reaction temperature of 65° C. is reached.

After 15 min reaction at 65° C. is the reaction mixture cooled to a temperature below 50° C. Hereby is a resin obtained having a COOH value of 1.2 mmol/g solids.

From the above mentioned AOL resin a binder was formulated by addition of 270 kg polyethylene glycol 200 and 433 kg of a 31% solution of Primid XL-552 in water.

Analysis of the final binder showed the following data

Solids content: 18.9%; pH: 9.7; Viscosity: 25.5 mPas·s; Density: 1.066 kg/l

Lignin Oxidation Examples

Examples I

Example IA—Lignin Oxidation in Ammonia Aqueous Solution by Hydrogen Peroxide The amounts of ingredients used according to the example IA are provided in table IA 1.1 and IA 1.2.

Although kraft lignin is soluble in water at relatively high pH, it is known that at certain weight percentage the viscosity of the solution will strongly increase. It is typically believed that the reason for the viscosity increase lies in a combination of strong hydrogen bonding and interactions of 7-electrons of numerous aromatic rings present in lignin. For kraft lignin an abrupt increase in viscosity around 21-22 wt.-% in water was observed and 19 wt.-% of kraft lignin were used in the example presented.

Ammonia aqueous solution was used as base in the pH adjusting step. The amount was fixed at 4 wt.-% based on the total reaction weight. The pH after the pH adjusting step and at the beginning of oxidation was 10.7.

Table IA2 shows the results of CHNS elemental analysis before and after oxidation of kraft lignin. Before the analysis, the samples were heat treated at 160° C. to remove adsorbed ammonia. The analysis showed that a certain amount of nitrogen became a part of the structure of the oxidised lignin during the oxidation process.

During testing in batch experiments, it was determined that it is beneficial for the oxidation to add the entire amount of hydrogen peroxide during small time interval contrary to adding the peroxide in small portions over prolonged time period. In the present example 2.0 wt.-% of $H_2O_2$ based on the total reaction weight was used.

The oxidation is an exothermic reaction and increase in temperature is noted upon addition of peroxide. In this example, temperature was kept at 60° C. during three hours of reaction.

After the oxidation, the amount of lignin functional groups per gram of sample increased as determined by $^{31}P$ NMR and aqueous titration. Sample preparation for $^{31}P$ NMR was performed by using 2-chloro-4,4,5,5-tetramethyl-1,3,2-dioxaphospholane (TMDP) as phosphitylation reagent and cholesterol as internal standard. NMR spectra of kraft lignin before and after oxidation were made and the results are summarized in table IA3.

The change in COOH groups was determined by aqueous titration and utilization of the following formula:

$$C_{(COOH, mmol/g)} = \frac{(V_{2s,ml} - V_{1s,ml}) - (V_{2b,ml} - V_{1b,ml}) * C_{acid, mol/l}}{m_{s,g}}$$

Where $V_{2s}$ and $V_{1s}$ are endpoint volumes of a sample while $V_{2b}$ and $V_{1b}$ are the volume for the blank. $C_{acid}$ is 0.1M HCl in this case and $m_s$ is the weight of the sample. The values obtained from aqueous titration before and after oxidation are shown in table IA4.

The average COOH functionality can also be quantified by a saponification value which represents the number of mg of KOH required to saponify 1 g lignin. Such a method can be found in AOCS Official Method Cd 3-25.

Average molecular weight was also determined before and after oxidation with a PSS PolarSil column (9:1 (v/v) dimethyl sulphoxide/water eluent with 0.05 M LiBr) and UV detector at 280 nm. Combination of COOH concentration and average molecular weight also allowed calculating average carboxylic acid group content per lignin macromolecule and these results are shown in table IA5.

Example IB—Upscaling the Lignin Oxidation in Ammonia by Hydrogen Peroxide to Pilot Scale Lignin oxidation with hydrogen peroxide is an exothermic process and even in lab-scale significant temperature increases were seen upon addition of peroxide. This is a natural concern when scaling up chemical processes since the amount of heat produced is related to dimensions in the $3^{rd}$ power (volume) whereas cooling normally only increase with dimension squared (area). In addition, due to the high viscosity of the adhesive intermediates process equipment has to be carefully selected or designed. Thus, the scale up was carefully engineered and performed in several steps.

The first scale up step was done from 1 L (lab scale) to 9 L using a professional mixer in stainless steel with very efficient mechanical mixing The scale-up resulted only in a slightly higher end temperature than obtained in lab scale, which was attributed to efficient air cooling of the reactor and slow addition of hydrogen peroxide The next scale up step was done in a closed 200 L reactor with efficient water jacket and an efficient propeller stirrer. The scale was this time 180 L and hydrogen peroxide was added in two steps with appr. 30 minute separation. This up-scaling went relatively well, though quite some foaming was an issue partly due to the high degree reactor filling. To control the foaming a small amount of food grade defoamer was sprayed on to the foam. Most importantly the temperature controllable and end temperatures below 70° C. were obtained using external water-cooling.

The pilot scale reactions were performed in an 800 L reactor with a water cooling jacket and a twin blade propeller stirring. 158 kg of lignin (UPM LignoBoost™ BioPiva 100) with a dry-matter content of 67 wt.-% was de-lumped and suspended in 224 kg of water and stirred to form a homogenous suspension. With continued stirring 103 kg of 25% ammonia in water was pumped into the reactor and stirred another 2 hours to from a dark viscous solution of lignin.

To the stirred lignin solution 140 kg of 7.5 wt.-% at 20-25° C. hydrogen peroxide was added over 15 minutes. Temperature and foam level was carefully monitored during and after the addition of hydrogen peroxide and cooling water was added to the cooling jacket in order to maintain an acceptable foam level and a temperature rise less than 4° C. per minute as well as a final temperature below 70° C. After the temperature increase had stopped, cooling was turned off and the product mixture was stirred for another 2 hours before transferring to transport container.

Based on the scale up runs it could be concluded that even though the reactions are exothermic a large part of the reaction heat is actually balanced out by the heat capacity of the water going from room temperature to about 60° C., and only the last part has to be removed by cooling. It should be noted that due to this and due to the short reaction time this process would be ideal for a scale up and process intensification using continuous reactors such as in-line mixers, tubular reactors or CSTR type reactors. This would ensure good temperature control and a more well-defined reaction process.

Tests of the scale up batches indicated the produced oxidised lignin had properties in accordance to the batches produced in the lab.

TABLE IA 1.1

The amounts of materials used in their supplied form:

| material | wt.-% |
|---|---|
| UPM BioPiva 100, kraft lignin | 28 |
| H$_2$O$_2$, 30 wt.-% solution in water | 6.6 |
| NH$_3$, 25 wt.-%, aqueous solution | 16 |
| water | 49.4 |

TABLE IA 1.2

The amounts of active material used:

| material | wt.-% |
|---|---|
| kraft lignin | 19 |
| H$_2$O$_2$ | 2 |
| NH$_3$ | 4 |
| water | 75 |

TABLE IA 2

Elemental analysis of kraft lignin before and after oxidation:

| sample | N (wt.-%) | C (wt.-%) | H (wt.-%) | S (wt.-%) |
|---|---|---|---|---|
| kraft lignin | 0.1 | 64.9 | 5.8 | 1.7 |
| ammonia oxidised kraft lignin | 1.6 | 65.5 | 5.7 | 1.6 |

TABLE IA 3

Kraft lignin functional group distribution before and after oxidation obtained by $^{31}$P-NMR:

| | Concentration (mmol/g) | | |
|---|---|---|---|
| sample | Aliphatic OH | Phenolic OH | Acid OH |
| kraft lignin | 1.60 | 3.20 | 0.46 |
| ammonia oxidised kraft lignin | 2.11 | 3.60 | 0.80 |

TABLE IA 4

COOH group content in mmol/g as determined by aqueous titration:

| sample | COOH groups (mmol/g) |
|---|---|
| kraft lignin | 0.5 |
| ammonia oxidised kraft lignin | 0.9 |

TABLE IA 5

Number (Mn) and weight (Mw) average molar masses as determined by size exclusion chromatography expressed in g/mol together with average carboxylic acid group content per lignin macromolecule before and after oxidation

| sample | Mn, g/mol | Mw, g/mol | average COOH functionality |
|---|---|---|---|
| kraft lignin | 1968 | 21105 | 0.9 |
| ammonia oxidised kraft lignin | 2503 | 34503 | 2.0 |

Examples II

In the following examples, several oxidised lignins were prepared. The following properties were determined for the oxidised lignins:

Component Solids Content:

The content of each of the components in a given oxidised lignin solution is based on the anhydrous mass of the components or as stated below.

Kraft lignin was supplier by UPM as BioPiva100™ as dry powder. NH$_4$OH 25% was supplied by Sigma-Aldrich and used in supplied form. H$_2$O$_2$, 30% (Cas no 7722-84-1) was supplied by Sigma-Aldrich and used in supplied form or by dilution with water. PEG 200 was supplied by Sigma-Aldrich and were assumed anhydrous for simplicity and used as such. PVA (Mw 89.000-98.000, Mw 85.000-124.000, Mw 130.000, Mw 146.000-186.000) (Cas no 9002-89-5) were supplied by Sigma-Aldrich and were assumed anhydrous for simplicity and used as such. Urea (Cas no 57-13-6) was supplied by Sigma-Aldrich and used in supplied form or diluted with water. Glycerol (Cas no 56-81-5) was supplied by Sigma-Aldrich and was assumed anhydrous for simplicity and used as such.

Oxidised Lignin Solids

The content of the oxidised lignin after heating to 200° C. for 1 h is termed "Dry solid matter" and stated as a percentage of remaining weight after the heating.

Disc-shaped stone wool samples (diameter: 5 cm; height 1 cm) were cut out of stone wool and heat-treated at 580° C. for at least 30 minutes to remove all organics. The solids of the binder mixture were measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the dry solids matter was calculated as an average of the two results.

COOH Group Content

The change in COOH group content was also determined by aqueous titration and utilization of the following formula:

$$C_{(COOH,mmol/g)} = \frac{(V_{2s,ml} - V_{1s,ml}) - (V_{2b,ml} - V_{1b,ml}) * C_{acid,mol/l}}{m_{s,g}}$$

Where $V_{2s}$ and $V_{1s}$ are endpoint volumes of a sample while $V_{2b}$ and $V_{1b}$ are the volume for a blank sample. $C_{acid}$ is 0.1M HCl in this case and $m_{s,g}$ is the weight of the sample.

Method of Producing an Oxidised Lignin:

1) Water and lignin was mixed in a 3-necked glass bottomed flask at water bath at room temperature (20-25° C.) during agitation connected with a condenser and a temperature logging device. Stirred for 1 h.
2) Ammonia was added during agitation in 1 portion.
3) Temperature increased to 35° C. by heating, if the slightly exothermic reaction with ammonia does not increase the temperature.
4) pH was measured.
5) Plasticizer PEG200 was added and stirred 10 min.
6) After the lignin was completely dissolved after approximately 1 hour, 30% H$_2$O$_2$ was added slowly in one portion.

7) The exothermic reaction by addition of $H_2O_2$ increased the temperature in the glass bottomed flask—if the reaction temperature was lower than 60C, the temperature was increased to 60° C. and the sample was left at 60° C. for 1 hour.
8) The round bottomed flask was then removed from the water bath and cooled to room temperature.
9) Samples were taken out for determination of dry solid matter, COOH, viscosity, density and pH.

Oxidised Lignin Compositions

In the following, the entry numbers of the oxidised lignin example correspond to the entry numbers used in Table II.

Example IIA 71.0 g lignin UPM Biopiva 100 was dissolved in 149.0 g water at 20° C. and added 1333 g 25% $NH_4OH$ and stirred for 1 h by magnetic stirrer, where after 16.8 g $H_2O_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example IIE 71.0 g lignin UPM Biopiva 100 was dissolved in 88.8 g water at 20° C. and added 13.3 g 25% $NH_4OH$ and stirred for 1 h by magnetic stirrer. PEG 200, 22.8 g was added and stirred for 10 min, where after 16.7 g $H_2O_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example IIC 71.0 g lignin UPM Biopiva 100 was dissolved in 57.1 g water at 20° C. and added 13.3 g 25% $NH_4OH$ and stirred for 1 h by mechanical stirrer, where after 16.6 g $H_2O_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example IIF 71.0 g lignin UPM Biopiva 100 was dissolved in 57.1 water at 20° C. and added 13.3 g 25% $NH_4OH$ and stirred for 1 h by mechanical stirrer. PEG 200, 19.0 g was added and stirred for 10 min, where after 16.6 g $H_2O_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

TABLE IIA

| Materials, weight in grams: | Ex. IIA | Ex. IIB | Ex. IIC | Ex. IID | Ex. IIE | Ex. IIF | Ex. IIG | Ex. IIH | Ex. III | Ex. IIJ |
|---|---|---|---|---|---|---|---|---|---|---|
| Lignin | 71.0 | 71.0 | 71.0 | 71.0 | 71.0 | 71.0 | 71.0 | 71.0 | 71.0 | 71.0 |
| Water | 149.0 | 88.8 | 57.1 | 17.7 | 88.8 | 57.1 | 17.7 | 88.8 | 57.1 | 17.7 |
| NH4OH (25 wt % solution in water) | 13.3 | 13.3 | 13.3 | 13.4 | 13.3 | 13.3 | 13.4 | 13.3 | 13.3 | 13.4 |
| H2O2 (30 wt % solution in water) | 16.8 | 16.7 | 16.6 | 17.2 | 16.7 | 16.6 | 17.2 | 16.7 | 16.6 | 17.2 |
| PEG200 | 0.0 | 0.0 | 0.0 | 0.0 | 22.8 | 19.0 | 14.2 | 0.0 | 0.0 | 0.0 |
| PVA | 0 | 0 | 0 | 0 | 0 | 0 | 0 | 5 | 10 | 15 |
| Urea (25 wt % solution in water) | 0 | 0 | 0 | 0 | 0 | 0 | 0 | 0 | 0 | 0 |
| Glycerol | 0 | 0 | 0 | 0 | 0 | 0 | 0 | 0 | 0 | 0 |
| Sorbitol | 0 | 0 | 0 | 0 | 0 | 0 | 0 | 0 | 0 | 0 |
| Dry solid matter in %, 200° C., 1 h | 18.2 | 27.1 | 30.5 | 40.1 | 26.5 | 33 | 40.3 | 28.2 | 34.4 | 46.3 |
| pH | 9.5 | 9.5 | 9.5 | 9.5 | 9.5 | 9.5 | 9.5 | 9.5 | 9.5 | 9.5 |
| Viscosity, 20° C. cP | 450.5 | 25000 | above 100000 | above 100000 | 15000 | 25000 | 50000 | 15000 | 25000 | 50000 |
| Appearance | ** | *** | * | * | *** | *** | *** | *** | *** | *** |
| COOH, mmol/g | 1.1 | 0.9 | 0.9 | 0.8 | 0.8 | 1.9 | — | — | — | — |
| Initial lignin conc. Weight fraction of aq. sol. | 0.32 | 0.44 | 0.55 | 0.80 | 0.44 | 0.55 | 0.80 | 0.44 | 0.55 | 0.80 |

| Materials, weight in grams: | Ex. IIK | Ex. IIL | Ex. IIM | Ex. IIN | Ex IIO | Ex. IIP | Ex. IIQ | Ex. IIR | Ex. IIS |
|---|---|---|---|---|---|---|---|---|---|
| Lignin | 71.0 | 71.0 | 71.0 | 71.0 | 71.0 | 71.0 | 93.5 | 112.3 | 149.5 |
| Water | 88.8 | 57.1 | 17.7 | 88.8 | 57.1 | 17.7 | 117 | 90.3 | 37.3 |
| NH4OH (25 wt % solution in water) | 13.3 | 13.3 | 13.4 | 13.3 | 13.3 | 13.4 | 17.5 | 21.0 | 28.3 |
| H2O2 (30 wt % solution in water) | 16.7 | 16.6 | 17.2 | 16.7 | 16.6 | 17.2 | 22 | 26.3 | 36.3 |
| PEG200 | 0.0 | 0.0 | 0.0 | 0.0 | 0.0 | 0.0 | 0.0 | 0.0 | 0.0 |
| PVA | 0 | 0 | 0 | 0 | 0 | 0 | 0 | 0 | 0 |
| Urea (25 wt % solution in water) | 3.2 | 3.8 | 5.0 | 0 | 0 | 0 | 0 | 0 | 0 |
| Glycerol | 0 | 0 | 0 | 16.0 | 21.0 | 30.0 | 0 | 0 | 0 |

TABLE IIA-continued

| | | | | | | | | | |
|---|---|---|---|---|---|---|---|---|---|
| Sorbitol | 0 | 0 | 0 | 0 | 0 | 0 | 16.0 | 21.0 | 30.0 |
| Dry solid matter in %, 200° C., 1 h | 25.1 | 30.2 | 40.2 | 25.3 | 29.3 | 40.3 | 25.3 | 30.5 | 38.8 |
| pH | 9.5 | 9.5 | 9.5 | 9.5 | 9.5 | 9.5 | 9.5 | 9.5 | 9.5 |
| Viscosity, 20° C. cP | 15000 | 25000 | 50000 | 15000 | 25000 | 50000 | 15000 | 25000 | 50000 |
| Appearance | *** | *** | *** | *** | *** | *** | *** | *** | *** |
| COOH, mmol/g | — | — | — | — | — | — | — | — | — |
| Initial lignin conc. Weight fraction of aq. sol. | 0.44 | 0.55 | 0.80 | 0.44 | 0.55 | 0.80 | 0.44 | 0.55 | 0.80 |

\* inhomogenous black thick solution;
\*\* black solution;
\*\*\* homogenous black thick solution.

Example III 8.5 l hot water (50° C.) and 1.9 l $NH_4OH$ (24.7%) was mixed, where after 9.0 kg lignin (UPM biopiva 100) was added slowly over 10 minutes at high agitation (660 rpm, 44 Hz).

The temperature increased by high shear forces. After 30 minutes, 4 l of hot water was added, and the material was stirred for another 15 minutes before adding the remaining portion of hot water (5 l). Samples were taken out for analyses of un-dissolved lignin by use of a Hegman Scale and pH measurements.

This premix was then transferred to a rotor-stator device and a reaction device where the oxidation was made by use of $H_2O_2$ (17.5 vol %). The reaction device used in this case has at least partially a reaction tube and a reaction vessel. Dosage of the premixture was 150 l/h and the $H_2O_2$ was dosed at 18 l/h.

In the present case, a Cavitron CD1000 rotor-stator device was used to carry out the mixing/oxidation step. The rotor-stator device was run at 250 Hz (55 m/s circumferential speed) with a counter pressure at 2 bar. The dwell time in the reaction tube was 3.2 minutes and in the reaction vessel 2 hours.

Temperature of the premixture was 62° C., and the oxidation step increased the temperature to 70° C.

The final product was analysed for the COOH group content, dry solid matter, pH, viscosity and remaining $H_2O_2$.

TABLE III

| Example | Dry solid matter, 200 C., 1 h, % | COOH, mmol/g solids | pH | viscosity |
|---|---|---|---|---|
| III | 22.3 | 1.13 | 9.6 | medium |

Example IV 484 l hot water (70° C.) and 47.0 l $NH_4OH$ (24.7%) was mixed, where after 224.0 kg lignin (UPM biopiva 100) was added slowly over 15 minutes at high agitation. Samples were taken out for analyses of un-dissolved lignin by use of a Hegman Scale and pH measurements.

This premixture was then transferred to a static mixer and a mixer/heat-exchanger, where the oxidation was made by use of $H_2O_2$ (35 vol %). Dosage of the premixture was 600 l/h and the $H_2O_2$ was dosed at 17.2 l/h. The dwell time in the mixer/heat-exchanger was 20 minutes.

The temperature of the mixture increased during the oxidation step up to 95° C.

The final product was analysed for the COOH group content, dry solid matter, pH, viscosity and remaining $H_2O_2$.

A binder was made based on this AOL: 49.3 g AOL (19.0% solids), 0.8 g primid XL552 (100% solids) and 2.4 g PEG200 (100% solids) were mixed with 0.8 g water to yield 19% solids; and then used for test of mechanical properties in bar tests.

Bar Tests

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured at 200° C. The curing time was 1 h. After cooling to room temperature, the bars were carefully taken out of the containers. Five of the bars were aged in a water bath at 80° C. for 3 h.

After drying for 1-2 days, the aged bars as well as five unaged bars were broken in a 3 point bending test (test speed: 10.0 mm/min, rupture level: 50%; nominal strength: 30 N/mm$^2$; support distance: 40 mm; max deflection 20 mm; nominal e-module 10000 N/mm$^2$) on a Bent Tram machine to investigate their mechanical strengths. The bars were placed with the "top face" up (i.e. the face with the dimensions length=5.6 cm, width=2.5 cm) in the machine.

| | AOL characteristics | | | Bar tests | |
|---|---|---|---|---|---|
| Sample name | solids, 200 C., 1 h, % | COOH (mmol/g solids) | Viscosity | initial strength (kN) | Aged strength (kN) |
| Ex IV | 17.7 | 1.69 | low | 0.28 | 0.11 |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of growing plants in a coherent growth substrate product, the method comprising:
providing at least one coherent growth substrate product comprising man-made vitreous fibres (MMVF) bonded with a cured aqueous binder composition;
positioning one or more seeds, seedlings, cuttings or plants in contact with the growth substrate product; and
irrigating the growth substrate product;
wherein the aqueous binder composition prior to curing comprises:
a first component (i) in the form of one or more oxidized lignins; and
a second component (iia) in the form of one or more of the following:
epoxidize oils based on fatty acid triglycerides;
one or more flexible oligomer or polymer which contains reactive functional groups, wherein
(a) the polymer is selected from: a low Tg acrylic based polymer; a low Tg vinyl based polymer; a and a low Tg polyether; and/or
(b) the reactive functional groups are selected from: carbodiimide groups, anhydride groups, oxazoline groups, and amino groups,
polyethylene imine, polyvinyl amine, or fatty amines;
aliphatic multifunctional carbodiimides;
β-hydroxyalkylamide-cross-linkers; and
oxazoline-cross-linkers.

2. The method according to claim 1, wherein the first component (i) is in the form of one or more ammonia-oxidized lignins (AOLs).

3. The method according to claim 1, wherein the aqueous binder composition comprises component (iia) in an amount of 1 to 40 wt. %, based on the dry weight of the component (i).

4. The method according to claim 1, further comprising:
a component (ii) in the form of one or more cross-linkers; and/or
a component (iii) in the form of one or more plasticizers.

5. The method according to claim 4, wherein the component (ii) comprises at least one of the following:
one or more cross-linkers selected from β-hydroxyalkylamide-cross-linkers and oxazoline-cross-linkers;
one or more cross-linkers selected from the group consisting of polyethylene imine, polyvinyl amine, and fatty amines;
one more cross-linkers in the form of fatty amides;
one or more cross-linkers selected from the group consisting of dimethoxyethanal, glycolaldehyde, and glyoxalic acid;
one or more cross-linkers selected from polyester polyols;
one or more cross-linkers selected from the group consisting of starch, modified starch, and carboxymethyl cellulose (CMC);
one or more cross-linkers in the form of aliphatic multifunctional carbodiimides; and
one or more cross-linkers selected from melamine based cross-linkers.

6. The method according to claim 4, wherein the component (iii) comprises at least one of the following:
one or more plasticizers selected from the group consisting of polyethylene glycols, polyethylene glycol ethers, polyethers, hydrogenated sugars, phthalates, acids, acrylic polymers, polyvinyl alcohol, polyurethane dispersions, ethylene carbonate, propylene carbonate, lactones, lactams, lactides, acrylic based polymers with free carboxy groups, and polyurethane dispersions with free carboxy groups;
one or more plasticizers selected from the group consisting of fatty alcohols and monohydroxy alcohols;
one or more plasticizers selected from the group consisting of alkoxylates;
one or more plasticizers in form of propylene glycols;
one or more plasticizers in form of glycol esters;
one or more plasticizers selected from the group consisting of adipates, acetates, benzoates, cyclobenzoates, citrates, stearates, sorbates, sebacates, azelates, butyrates, and valerates;
one or more plasticizers selected from the group consisting of phenol derivatives;
one or more plasticizers selected from the group consisting of silanols and siloxanes;
one or more plasticizers selected from the group consisting of sulfates, sulfonates, and phosphates;
one or more plasticizers in the form of hydroxy acids;
one or more plasticizers selected from the group consisting of monomeric amides, benzamide, and fatty acid amides;
one or more plasticizers selected from the group consisting of quaternary ammonium compounds;
one or more plasticizers selected from the group consisting of vegetable oils;
one or more plasticizers selected from the group consisting of hydrogenated oils and acetylated oils;
one or more plasticizers selected from acid methyl esters;
one or more plasticizers selected from the group consisting of alkyl polyglucosides, gluconamides, aminoglucoseamides, sucrose esters, and sorbitan esters; and
one or more plasticizers selected from the group consisting of polyethylene glycols and polyethylene glycol ethers.

7. The method according to claim 4, wherein:
(a) the component (ii) is present in an amount of 1 to 40 wt. %, based on a dry weight of the first component (i); and/or
(b) the component (iii) is present in an amount of 0.5 to 50 wt. %, based on a dry weight of the first component (i).

8. The method according to claim 1, wherein the aqueous binder composition further comprises one or more of:
a component (iv) in the form of one or more coupling agents;
a component (v) in the form of one or more components selected from the group consisting of ammonia, amines, and any salts thereof;
a component in the form of urea, in an amount of 5 to 40 wt. %, based on a dry weight of the first component (i).

9. The method according to claim 1, wherein the aqueous binder composition consists essentially of
a component (i) in the form of one or more oxidized lignins;
a component (iia) in the form of one or more modifiers selected from epoxidised oils based on fatty acid triglycerides;
a component (iv) in the form of one or more coupling agents, such as organofunctional silanes;
optionally a component in the form of one or more compounds selected from the group of ammonia, amines or any salts thereof;
optionally a component in the form of urea;
optionally a component in the form of a more reactive or non-reactive silicones;

optionally a hydrocarbon oil;
optionally one or more surface active agents; and
water.

10. The method according to claim 1, wherein the MMVF of the coherent growth substrate product have a contact angle with water of less than 90°.

11. The method according to claim 1, wherein the MMVF of the coherent growth substrate product have a geometric mean fibre diameter in the range of 1.5 to 10 microns.

12. The method according to claim 1, wherein the coherent growth substrate product has:
a volume in the range of 0.003 litres to 87 litres; and/or
a height of 10 millimeters (mm) to 150 mm.

13. The method according to claim 1, wherein the coherent growth substrate product comprises a liquid-impermeable covering.

14. The method according to claim 1, wherein the coherent growth substrate product does not comprise any wetting agent.

15. A coherent growth substrate product comprising man-made vitreous fibres (MMVF) bonded with a cured aqueous binder composition, wherein the aqueous binder composition prior to curing comprises:
a first component (i) in the form of one or more oxidized lignins; and
a second component (iia) in the form of one or more of the following:
epoxidized oils based on fatty acid triglycerides;
one or more flexible oligomer or polymer which contains reactive functional groups, wherein
(a) the polymer is selected from: a low Tg acrylic based polymer; a low Tg vinyl based polymer; a and a low Tg polyether; and/or
(b) the reactive functional groups are selected from: carbodiimide groups, anhydride groups, oxazoline groups, and amino groups,
polyethylene imine, polyvinyl amine, or fatty amines;
aliphatic multifunctional carbodiimides;
β-hydroxyalkylamide-cross-linkers; and
oxazoline-cross-linkers.

16. An array of two or more coherent growth substrate products, wherein each the coherent growth substrate product comprises man-made vitreous fibres (MMVF) bonded with a cured aqueous binder composition, wherein the aqueous binder composition prior to curing comprises:
a first component (i) in the form of one or more oxidized lignins; and
a second component (iia) in the form of one or more of the following:
epoxidize oils based on fatty acid triglycerides;
one or more flexible oligomer or polymer which contains reactive functional groups, wherein
(a) the polymer is selected from: a low Tg acrylic based polymer; a low Tg vinyl based polymer; a and a low Tg polyether; and/or
(b) the reactive functional groups are selected from: carbodiimide groups, anhydride groups, oxazoline groups, and amino groups,
polyethylene imine, polyvinyl amine, or fatty amines;
aliphatic multifunctional carbodiimides;
β-hydroxyalkylamide-cross-linkers; and
oxazoline-cross-linkers.

17. Use of a coherent growth substrate product for growing plants, wherein the coherent growth substrate product comprises man-made vitreous fibres (MMVF) bonded with a cured aqueous binder composition, and wherein the aqueous binder composition prior to curing comprises:
a first component (i) in the form of one or more oxidized lignins; and
a second component (iia) in the form of one or more of the following:
epoxidize oils based on fatty acid triglycerides;
one or more flexible oligomer or polymer which contains reactive functional groups, wherein
(a) the polymer is selected from: a low Tg acrylic based polymer; a low Tg vinyl based polymer; a and a low Tg polyether; and/or
(b) the reactive functional groups are selected from: carbodiimide groups, anhydride groups, oxazoline groups, and amino groups,
polyethylene imine, polyvinyl amine, or fatty amines;
aliphatic multifunctional carbodiimides;
β-hydroxyalkylamide-cross-linkers; and
oxazoline-cross-linkers.

18. A method of making a growth substrate product comprising the steps of:
(i) providing MMVF;
(ii) spraying the MMVF with an aqueous binder composition;
(iii) collecting and consolidating the MMVF; and
(iv) curing the aqueous binder composition;
wherein the aqueous binder composition prior to curing comprises:
a first component (i) in the form of one or more oxidized lignins; and
a second component (iia) in the form of one or more of the following:
epoxidize oils based on fatty acid triglycerides;
one or more flexible oligomer or polymer which contains reactive functional groups, wherein
(a) the polymer is selected from: a low Tg acrylic based polymer; a low Tg vinyl based polymer; a and a low Tg polyether; and/or
(b) the reactive functional groups are selected from: carbodiimide groups, anhydride groups, oxazoline groups, and amino groups;
polyethylene imine, polyvinyl amine, or fatty amines;
aliphatic multifunctional carbodiimides;
β-hydroxyalkylamide-cross-linkers; and
oxazoline-cross-linkers.

\* \* \* \* \*